(12) United States Patent
Kaminsky

(10) Patent No.: US 7,647,972 B2
(45) Date of Patent: Jan. 19, 2010

(54) SUBSURFACE FREEZE ZONE USING FORMATION FRACTURES

(75) Inventor: Robert D. Kaminsky, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 12/343,127

(22) Filed: Dec. 23, 2008

(65) Prior Publication Data

US 2009/0107679 A1    Apr. 30, 2009

Related U.S. Application Data

(62) Division of application No. 11/973,745, filed on Oct. 10, 2007, now Pat. No. 7,516,787.

(60) Provisional application No. 60/851,543, filed on Oct. 13, 2006.

(51) Int. Cl.
*E21B 36/00* (2006.01)
*E21B 43/26* (2006.01)

(52) U.S. Cl. .................... 166/302; 166/306; 166/308.1; 405/130

(58) Field of Classification Search .................. 166/306
See application file for complete search history.

(56) References Cited

U.S. PATENT DOCUMENTS

| | | | |
|---|---|---|---|
| 363,419 A | 5/1887 | Poetsch | |
| 1,342,780 A | 6/1920 | Vedder | |
| 1,422,204 A | 7/1922 | Hoover et al. | |
| 1,666,488 A | 4/1928 | Crawshaw | |
| 1,701,884 A | 2/1929 | Hogle | |
| 2,033,560 A | 3/1936 | Wells | 166/1 |
| 2,033,561 A | 3/1936 | Wells | 166/21 |
| 2,732,195 A | 1/1956 | Ljungstrom | 262/3 |
| 2,777,679 A | 1/1957 | Ljungstrom | 262/3 |
| 2,812,160 A | 11/1957 | West et al. | 255/1.4 |
| 2,847,071 A | 8/1958 | De Priester et al. | 166/39 |
| 2,887,160 A | 5/1959 | De Priester | 166/59 |
| 2,895,555 A | 7/1959 | De Priester | 166/59 |

(Continued)

FOREIGN PATENT DOCUMENTS

FR   EP 0866212   9/1998

(Continued)

OTHER PUBLICATIONS

U.S. Appl. No. 11/973,745, filed Oct. 10, 2007, Kaminsky.

(Continued)

*Primary Examiner*—George Suchfield

(57) ABSTRACT

A method of lowering the temperature of a subsurface formation, e.g., a subsurface formation including oil shale, includes completing a well having fluid communication with the subsurface formation at a first depth and a second lower depth. A fracturing fluid is injected into the well so as to form a fracture at a depth of the subsurface formation, and thereby provides fluid communication between the first and second depths in the well. A cooling fluid is circulated under pressure through the well and into the fracture so as to cause the cooling fluid to flow from the well, into subsurface formation at the first depth, to the subsurface formation at the second depth, and back into the well, thereby lowering the temperature of the subsurface formation.

23 Claims, 13 Drawing Sheets

U.S. PATENT DOCUMENTS

| | | | |
|---|---|---|---|
| 2,944,803 A | 7/1960 | Hanson | 299/4 |
| 2,952,450 A | 9/1960 | Purre | 262/3 |
| 3,004,601 A | 10/1961 | Bodine | 166/39 |
| 3,095,031 A | 6/1963 | Eurenius et al. | 158/99 |
| 3,109,482 A | 11/1963 | O'Brien | 158/115 |
| 3,127,936 A | 4/1964 | Eurenius | 166/39 |
| 3,183,675 A | 5/1965 | Schroeder | 61/36 |
| 3,194,315 A | 7/1965 | Rogers | 166/57 |
| 3,225,829 A | 12/1965 | Chown et al. | 166/59 |
| 3,241,611 A | 3/1966 | Dougan | 166/7 |
| 3,241,615 A | 3/1966 | Brandt et al. | 166/59 |
| 3,254,721 A | 6/1966 | Smith | 166/59 |
| 3,267,680 A | 8/1966 | Schlumberger | 61/36 |
| 3,271,962 A | 9/1966 | Dahms et al. | 61/36 |
| 3,284,281 A | 11/1966 | Thomas | 166/2 |
| 3,295,328 A | 1/1967 | Bishop | 61/0.5 |
| 3,372,550 A | 3/1968 | Schroeder | 61/36 |
| 3,376,403 A | 4/1968 | Mircea | 219/10.49 |
| 3,400,762 A | 9/1968 | Peacock et al. | 166/11 |
| 3,436,919 A | 4/1969 | Shock et al. | 61/0.5 |
| 3,455,391 A | 7/1969 | Matthews et al. | 166/303 |
| 3,468,376 A | 9/1969 | Slusser et al. | 166/272 |
| 3,513,914 A | 5/1970 | Vogel | 166/271 |
| 3,528,252 A | 9/1970 | Gail | 61/36 |
| 3,559,737 A | 2/1971 | Ralstin et al. | 166/281 |
| 3,602,310 A | 8/1971 | Halvert | 166/303 |
| 3,613,785 A | 10/1971 | Closmann et al. | 166/271 |
| 3,729,965 A | 5/1973 | Gartner | 70/395 |
| 3,741,306 A * | 6/1973 | Papadopoulos et al. | 166/252.1 |
| 3,759,329 A | 9/1973 | Ross | 166/308.1 |
| 3,882,937 A | 5/1975 | Robinson | 166/267 |
| 3,943,722 A | 3/1976 | Ross | 61/36 A |
| 4,003,432 A | 1/1977 | Paul et al. | 166/271 |
| 4,125,159 A | 11/1978 | Vann | 166/285 |
| 4,140,180 A | 2/1979 | Bridges et al. | 166/248 |
| 4,358,222 A | 11/1982 | Landau | 405/130 |
| 4,474,238 A | 10/1984 | Gentry et al. | 166/268 |
| 4,589,491 A | 5/1986 | Perkins | 166/302 |
| 4,607,488 A | 8/1986 | Karinthi et al. | 62/42 |
| 4,626,665 A | 12/1986 | Fort, III | 219/534 |
| 4,634,315 A | 1/1987 | Owen et al. | 405/217 |
| 4,704,514 A | 11/1987 | Van Egmond et al. | 219/278 |
| 4,860,544 A | 8/1989 | Krieg et al. | 62/45 |
| 4,886,118 A | 12/1989 | Van Meurs et al. | 166/245 |
| 5,225,742 A | 7/1993 | Beasley | 315/307 |
| 5,392,854 A | 2/1995 | Vinegar et al. | 166/271 |
| 5,416,257 A | 5/1995 | Peters | 588/1 |
| 5,730,550 A | 3/1998 | Andersland et al. | 405/128 |
| 5,899,269 A | 5/1999 | Wellington et al. | 166/58 |
| 6,023,554 A | 2/2000 | Vinegar et al. | 392/301 |
| 6,581,684 B2 | 6/2003 | Wellington et al. | 166/245 |
| 6,684,644 B2 | 2/2004 | Mittricker et al. | 60/772 |
| 6,742,588 B2 | 6/2004 | Wellington et al. | 166/245 |
| 6,782,947 B2 | 8/2004 | de Rouffignac et al. | 166/245 |
| 6,796,139 B2 | 9/2004 | Briley et al. | 62/260 |
| 6,854,929 B2 | 2/2005 | Vinegar et al. | 405/129.65 |
| 6,858,049 B2 | 2/2005 | Mittricker | 48/127.7 |
| 6,880,633 B2 | 4/2005 | Wellington et al. | 166/245 |
| 6,932,155 B2 | 8/2005 | Vinegar et al. | 166/245 |
| 6,948,562 B2 | 9/2005 | Wellington et al. | 166/272.1 |
| 6,964,300 B2 | 11/2005 | Vinegar et al. | 166/245 |
| 6,969,123 B2 | 11/2005 | Vinegar et al. | 299/3 |
| 7,011,154 B2 | 3/2006 | Maher et al. | 166/245 |
| 7,032,660 B2 | 4/2006 | Vinegar et al. | 166/245 |
| 7,066,254 B2 | 6/2006 | Vinegar et al. | 166/245 |
| 7,073,578 B2 | 7/2006 | Vinegar et al. | 166/245 |
| 7,077,198 B2 | 7/2006 | Vinegar et al. | 166/52 |
| 7,104,319 B2 | 9/2006 | Vinegar et al. | 166/245 |
| 7,121,342 B2 | 10/2006 | Vinegar et al. | 166/302 |
| 7,198,107 B2 * | 4/2007 | Maguire | 166/308.2 |
| 7,331,385 B2 | 2/2008 | Symington et al. | 166/248 |
| 7,357,180 B2 | 4/2008 | Vinegar et al. | 166/254.1 |
| 2003/0080604 A1 | 5/2003 | Vinegar et al. | |
| 2004/0198611 A1 | 10/2004 | Atkinson | |
| 2005/0252656 A1 * | 11/2005 | Maguire | 166/256 |
| 2005/0269077 A1 | 12/2005 | Sandberg | 166/249 |
| 2007/0023186 A1 | 2/2007 | Kaminsky et al. | 166/266 |
| 2007/0045265 A1 | 3/2007 | McKinzie | 219/207 |
| 2007/0107901 A1 * | 5/2007 | Maguire | 166/302 |
| 2007/0144732 A1 | 6/2007 | Kim et al. | |
| 2007/0246994 A1 | 10/2007 | Kaminsky et al. | 299/3 |
| 2008/0087420 A1 | 4/2008 | Symington et al. | |
| 2008/0087421 A1 | 4/2008 | Kaminsky | |
| 2008/0087426 A1 | 4/2008 | Kaminsky | |
| 2008/0087427 A1 | 4/2008 | Symington et al. | |
| 2008/0087428 A1 | 4/2008 | Symington et al. | |

FOREIGN PATENT DOCUMENTS

| | | |
|---|---|---|
| GB | 855408 | 11/1960 |
| WO | WO 82/01408 | 4/1982 |
| WO | WO 2005/010320 | 2/2005 |
| WO | WO 2005/045192 | 5/2005 |
| WO | WO 2008/048448 | 4/2008 |
| WO | WO 2008/048532 | 4/2008 |

OTHER PUBLICATIONS

Boyer, H. et al. (1985) "Heat-Resistant Materials," *Metals Handbook*, Chap. 16., Amer. Soc. for Metals.

Brandt, H. et al. (1965) "Stimulating Heavy Oil Reserves With Downhole Air-Gas Burners," *World Oil*, pp. 91-95.

De Priester, C. et al. (1963) "Well Stimulation by Downhole Gas-Air Burner," *Journal of Petro. Tech.*, pp. 1297-1302.

Mut, S. (2005) "The Potential of Oil Shale," Presentation to the National Academies, Washington, DC, Oct. 20-21, 2005, 11 pages.

Rupprecht, R. (1979) "Application of the Ground-Freezing Method to Penetrate a Sequence of Water-Bearing and Dry Formations—Three Construction Cases," *Engineering Geology*, 13, pp. 541-546.

Salomonsson, G. (1951) "The Ljunstrom In-Situ Method for Shale-Oil Recovery" *Oil Shale and Cannel Coal* (vol. 2), *Proceedings of the 2nd Oil Shale and Cannel Coal Conference*, Glasgow, Jul. 1951, pp. 260-280.

Sierra, R. et al. (2001) "Promising Progress in Field Application of Reservoir Electrical Heating Methods," *SPE Paper* 69709.

Smith, F. M. (1966) "A Down-Hole Burner—Versatile Tool for Well Heating," 25th *Tech. Conf Petro. Prod.*, Pennsylvania State Univ., pp. 275-285.

Stoss, K. et al. (1979) "Uses and Limitations of Ground Freezing With Liquid Nitrogen," *Engineering Geology*, 13, pp. 485-494.

EP Search Report No. RS114890 dated Mar. 21, 2007, 2 pages.

International Search Report dated Apr. 4, 2008 for PCT/US07/21660 filed Oct. 10, 2007.

International Search Report dated Apr. 4, 2008 for PCT/US07/21666 filed Oct. 10, 2007.

* cited by examiner

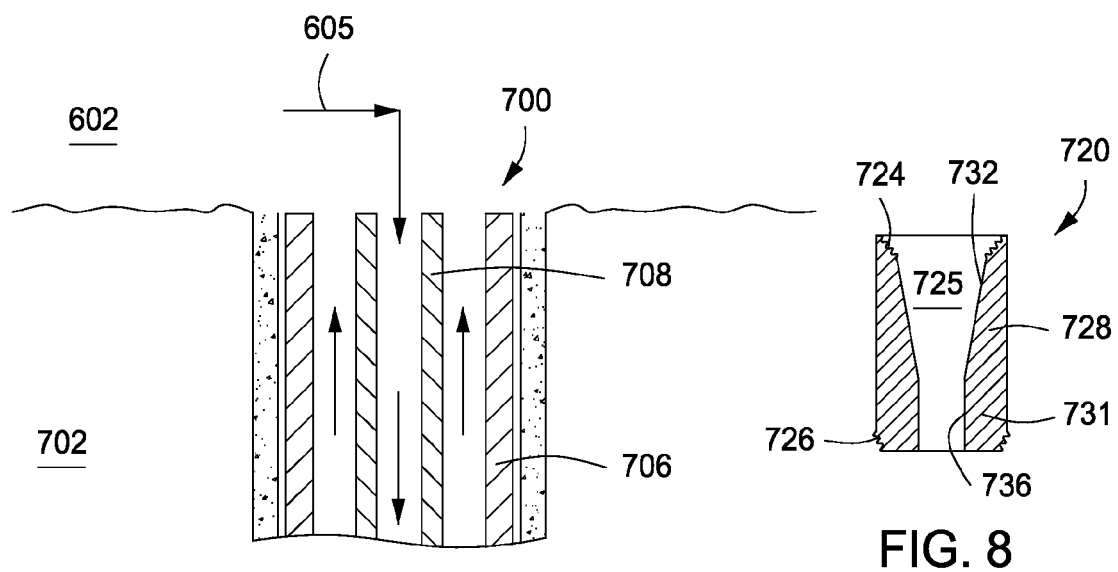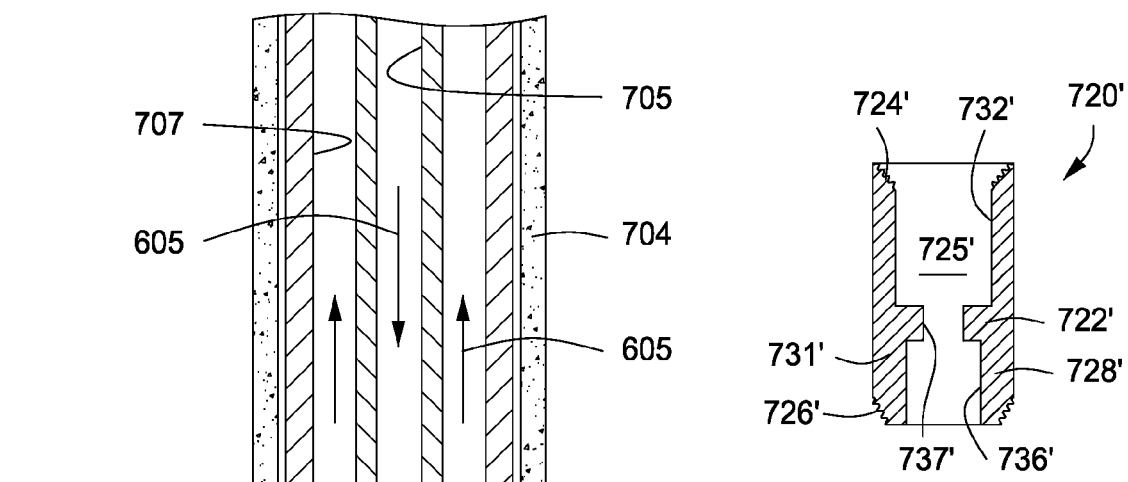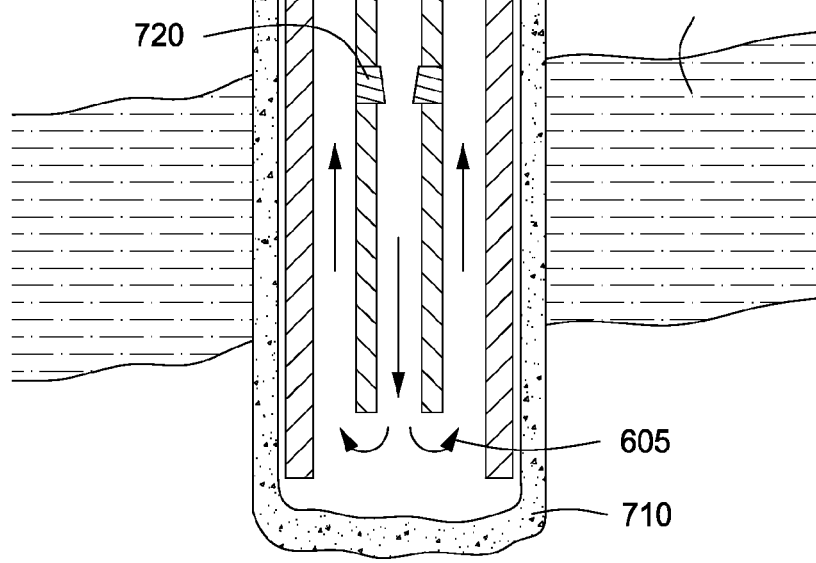

SUBSURFACE FREEZE ZONE USING FORMATION FRACTURES

CROSS-REFERENCE TO RELATED APPLICATIONS

This application is a divisional application of U.S. patent application Ser. No. 11/973,745, entitled METHOD OF DEVELOPING A SUBSURFACE FREEZE ZONE USING FORMATION FRACTURES, filed on Oct. 10, 2007, which issued as U.S. Pat. No. 7,516,787, and which also claims the benefit of U.S. Provisional application 60/851,543 which was filed on Oct. 13, 2006. This application also claims the benefit of U.S. Provisional application 60/851,543 which was filed on Oct. 13, 2006. The provisional application is incorporated herein in its entirety by reference. The present application claims the benefit of U.S. patent application Ser. No. 11/973, 745 and U.S. Provisional Patent Application No. 60/851,543 under 35 U.S.C. §120 and 35 U.S.C. 119, respectively. This application is also related to co-pending, concurrently filed, and commonly assigned U.S. patent application Ser. No. 11/973,764, filed Oct. 10, 2007, entitled "Method of Developing Subsurface Freeze Zone," and U.S. patent application Ser. No. 12/343,109, filed Dec. 23, 2008, which each also claim the benefit of U.S. Provisional Patent Application Ser. No. 60/851,543, filed Oct. 13, 2006.

BACKGROUND OF THE INVENTION

1. Field of the Invention

The present invention relates to the field of hydrocarbon recovery from subsurface formations. More specifically, the present invention relates to the in situ recovery of hydrocarbon fluids from organic-rich rock formations including, for example, oil shale formations, coal formations and tar sands formations. The present invention also relates to methods for lowering the temperature of a subsurface formation, and containing fluids within a shale oil development area through the reduction in temperature of a selected portion of a subsurface formation.

2. Background of the Invention

Certain geological formations are known to contain an organic matter known as "kerogen." Kerogen is a solid, carbonaceous material. When kerogen is imbedded in rock formations, the mixture is referred to as oil shale. This is true whether or not the mineral is, in fact, technically shale, that is, a rock formed from compacted clay.

Kerogen is subject to decomposing upon exposure to heat over a period of time. Upon heating, kerogen molecularly decomposes to produce oil, gas, and carbonaceous coke. Small amounts of water may also be generated. The oil, gas and water fluids become mobile within the rock matrix, while the carbonaceous coke remains essentially immobile.

Oil shale formations are found in various areas worldwide, including the United States. Oil shale formations tend to reside at relatively shallow depths. In the United States, oil shale is most notably found in Wyoming, Colo., and Utah. These formations are often characterized by limited permeability. Some consider oil shale formations to be hydrocarbon deposits which have not yet experienced the years of heat and pressure thought to be required to create conventional oil and gas reserves.

The decomposition rate of kerogen to produce mobile hydrocarbons is temperature dependent. Temperatures generally in excess of 270° C. (518° F.) over the course of many months may be required for substantial conversion. At higher temperatures substantial conversion may occur within shorter times. When kerogen is heated, chemical reactions break the larger molecules forming the solid kerogen into smaller molecules of oil and gas. The thermal conversion process is referred to as pyrolysis or retorting.

Attempts have been made for many years to extract oil from oil shale formations. Near-surface oil shales have been mined and retorted at the surface for over a century. In 1862, James Young began processing Scottish oil shales. The industry lasted for about 100 years. Commercial oil shale retorting through surface mining has been conducted in other countries as well such as Australia, Brazil, China, Estonia, France, Russia, South Africa, Spain, and Sweden. However, the practice has been mostly discontinued in recent years because it proved to be uneconomical or because of environmental constraints on spent shale disposal. (See T. F. Yen, and G. V. Chilingarian, "Oil Shale," Amsterdam, Elsevier, p. 292, the entire disclosure of which is incorporated herein by reference.) Further, surface retorting requires mining of the oil shale, which limits application to very shallow formations.

In the United States, the existence of oil shale deposits in northwestern Colorado has been known since the early 1900's. While research projects have been conducted in this area from time to time, no serious commercial development has been undertaken. Most research on oil shale production has been carried out in the latter half of the 1900's. The majority of this research was on shale oil geology, geochemistry, and retorting in surface facilities.

In 1947, U.S. Pat. No. 2,732,195 issued to Ljungstrom. That patent, entitled "Method of Treating Oil Shale and Recovery of Oil and Other Mineral Products Therefrom," proposed the application of heat at high temperatures to the oil shale formation in situ to distill and produce hydrocarbons. The '195 Ljungstrom patent is incorporated herein by reference.

Ljungstrom coined the phrase "heat supply channels" to describe bore holes drilled into the formation. The bore holes received an electrical heat conductor which transferred heat to the surrounding oil shale. Thus, the heat supply channels served as heat injection wells. The electrical heating elements in the heat injection wells were placed within sand or cement or other heat-conductive material to permit the heat injection wells to transmit heat into the surrounding oil shale while preventing the inflow of fluid. According to Ljungstrom, the "aggregate" was heated to between 500° and 1,000° C. in some applications.

Along with the heat injection wells, fluid producing wells were also completed in near proximity to the heat injection wells. As kerogen was pyrolyzed upon heat conduction into the rock matrix, the resulting oil and gas would be recovered through the adjacent production wells.

Ljungstrom applied his approach of thermal conduction from heated wellbores through the Swedish Shale Oil Company. A full scale plant was developed that operated from 1944 into the 1950's. (See G. Salamonsson, "*The Ljungstrom In Situ Method for Shale-Oil Recovery,*" $2^{nd}$ Oil Shale and Cannel Coal Conference, v. 2, Glasgow, Scotland, Institute of Petroleum, London, p. 260-280 (1951), the entire disclosure of which is incorporated herein by reference.)

Additional in situ methods have been proposed. These methods generally involve the injection of heat and/or solvent into a subsurface oil shale. Heat may be in the form of heated methane (see U.S. Pat. No. 3,241,611 to J. L. Dougan), flue gas, or superheated steam (see U.S. Pat. No. 3,400,762 to D. W. Peacock). Heat may also be in the form of electric resistive heating, dielectric heating, radio frequency (RF) heating (U.S. Pat. No. 4,140,180, assigned to the ITT Research Institute in Chicago, Ill.) or oxidant injection to support in situ combustion. In some instances, artificial permeability has been created in the matrix to aid the movement of pyrolyzed fluids. Permeability generation methods include mining, rubblization, hydraulic fracturing (see U.S. Pat. No. 3,468,376 to M. L. Slusser and U.S. Pat. No. 3,513,914 to J. V. Vogel), explosive fracturing (see U.S. Pat. No. 1,422,204 to W. W. Hoover, et al.), heat fracturing (see U.S. Pat. No. 3,284,281 to R. W. Thomas), and steam fracturing (see U.S. Pat. No. 2,952,450 to H. Purre).

In 1989, U.S. Pat. No. 4,886,118 issued to Shell Oil Company, the entire disclosure of which is incorporated herein by reference. That patent, entitled "Conductively Heating a Subterranean Oil Shale to Create Permeability and Subsequently Produce Oil," declared that "[c]ontrary to the implications of . . . prior teachings and beliefs . . . the presently described conductive heating process is economically feasible for use even in a substantially impermeable subterranean oil shale." (col. 6, ln. 50-54). Despite this declaration, it is noted that few, if any, commercial in situ shale oil operations have occurred other than Ljungstrom's application. The '118 patent proposed controlling the rate of heat conduction within the rock surrounding each heat injection well to provide a uniform heat front.

Additional history behind oil shale retorting and shale oil recovery can be found in co-owned patent publication WO 2005/010320 entitled "Methods of Treating a Subterranean Formation to Convert Organic Matter into Producible Hydrocarbons," and in patent publication WO 2005/045192 entitled "Hydrocarbon Recovery from Impermeable Oil Shales." The Background and technical disclosures of these two patent publications are incorporated herein by reference.

A need exists for improved processes for the production of shale oil. In addition, a need exists for improved methods for containing water and production fluids within a hydrocarbon development area. Still further, a need exists for an improved freeze well that uses formation fractures.

SUMMARY OF THE INVENTION

The methods described herein have various benefits in improving the cooling efficiency of certain prior art methods. In various embodiments, such benefits may include the reduction of cooling losses to the overburden, reducing the amount of fluid needed to be circulated, or speeding the formation of an impermeable freeze zone.

According to one general aspect, a method of lowering the temperature of a subsurface formation comprising oil shale includes completing a well having fluid communication with the subsurface formation at a first depth and a second lower depth. A fracturing fluid is injected into the well so as to form a fracture at a depth of the subsurface formation, thereby providing fluid communication between the first and second depths in the well. A cooling fluid is circulated under pressure through the well and into the fracture so as to cause the cooling fluid to flow from the well, into subsurface formation at the first depth, to the subsurface formation at the second depth, and back into the well, thereby lowering the temperature of the subsurface formation.

Implementations of this aspect may include one or more of the following features. For example, the well may be substantially vertical or substantially horizontal within the subsurface formation. The fracture may be substantially vertical or the fracture may be substantially horizontal. The fracture fluid may contain proppant. The cooling fluid may include at least of 50 mol. percent of methane, ethane, propane, propylene, ethylene, isobutane, and/or a mixture thereof. The well may include an elongated tubular member that receives the cooling fluid en route to the subsurface formation. The well may further include an expansion valve in fluid communication with the tubular member through which the cooling fluid flows to cool the subsurface formation. The expansion valve may be positioned along the tubular member proximate an upper depth of the subsurface formation. The cooling fluid may be a slurry that comprises particles of frozen material. The particles may be less than 50 microns in size. The cooling fluid may define a partially frozen salt-water mixture, a partially frozen alcohol-water mixture, and/or a partially frozen glycol-water mixture. The cooling fluid may be a liquid comprising an alcohol, an alcohol mixture, and/or an alcohol-water mixture. The cooling fluid may be a mixture with a composition that is close to the eutectic composition. The particles may be formed through a process of mechanical grinding. The particles may have a composition different than the cooling fluid. The composition of the particles may have a freezing temperature that is higher than the cooling fluid, and the particles may be formed by rapidly cooling the cooling fluid below the freezing temperature of the particles, but not below the freezing temperature of the cooling fluid. The particles may be seeded into the cooling fluid in a frozen state. The particles may include a biphasic material having an external portion and an internal portion such that the external portion has a higher freezing temperature than the internal portion. The fracturing fluid may include a proppant to prop the formation. The well may be formed outside of an area under shale oil development. The subsurface formation may include in situ water, and the cooling fluid may cool the subsurface formation sufficient to freeze at least a portion of the in situ water. The method may include injecting low salinity water into at least a portion of the subsurface formation to reduce the natural salinity of the in situ water and to raise the freezing temperature of the in situ water.

A method for lowering the temperature of a subsurface formation is provided herein. This method includes the step of injecting a cooling fluid under pressure into a wellbore. The cooling fluid comprises a slurry having particles of frozen material. The cooling fluid is circulated across the formation in order to lower the temperature of at least a portion of the formation. Preferably, the temperature is lowered to a point below the freezing point of water.

Use of a slurry can have the benefit of significantly increasing the "cold energy" carried by the cooling fluid per mass of fluid. Moreover, a slurry can maintain a relatively constant temperature even as it loses "cold energy" due to the latent heat of fusion of the solids.

The wellbore is completed at or below a depth of the subsurface formation. The wellbore has a bore formed through the subsurface formation that defines a diameter. In this case no downhole expansion valve is required. Use of a slurry can have the extra benefit of removing or reducing the need for insulation between the upward and downward flows since the slurry can be maintained at a relatively constant temperature as long as frozen solids are still present.

It is preferred that the steps for the method be repeated for a plurality of wellbores. In one aspect, at least ten adjacent freeze wells are completed. The cooling fluid is circulated within the ten adjacent freeze wells in order to form a flow barrier in the subsurface formation. In one aspect, the integrity of the flow barrier is monitored by analyzing compositions of fluid samples taken from wells formed outside of the flow barrier.

In one aspect of this additional embodiment, the wellbore includes an elongated tubular member that receives the cooling fluid en route to the subsurface formation. The elongated tubular member may be a U-tube. In this instance, the method further includes circulating the cooling fluid into the U-tube, to the completion depth, and back to the surface.

The wellbore may further comprise an annular region formed between the elongated tubular member and the diameter of the wellbore. In this instance, the method may further include circulating the fluid into the tubular member, to the completion depth, and back up the wellbore through the annular region.

Various cooling fluids may be used. In one aspect, the cooling fluid is a partially frozen salt-water mixture. The salt in the salt-water mixture may be, for example, NaCl or $CaCl_2$. The cooling fluid may alternately define a partially frozen alcohol-water mixture. The alcohol may be, for example, methanol or ethanol.

In another aspect, the cooling fluid may define a partially frozen glycol-water mixture. The glycol may be, for example, MEG, DEG, or propylene glycol. In another aspect, the cooling fluid may define a hydrocarbon mixture comprised of greater than 50 mol. percent carbon molecules of $C_7$, $C_8$, $C_9$, $C_{10}$, $C_{11}$, $C_{12}$, $C_{13}$, $C_{14}$, or mixtures thereof.

The particles of frozen material used in this additional embodiment may be less than 50 microns in size. Some or all of the particles may be less than 10 microns in size.

Preferably, the cooling fluid is at a temperature of about −20° F. to −120° F. after passing through the first expansion valve. More preferably, the cooling fluid is at a temperature of about −20° F. to −80° F. after passing through the first expansion valve. More preferably still, the cooling fluid is at a temperature of about −30° F. to −60° F. after passing through the first expansion valve.

Preferably, the subsurface formation holds in situ water. Further, the cooling fluid cools the subsurface formation to a sufficient extent to freeze at least a portion of the in situ water. In one aspect, the method further includes the step of injecting low salinity water into at least a portion of the subsurface formation to reduce the natural salinity of the in situ water and to raise the freezing temperature of the in situ water.

In some instance, a single downhole expansion valve is used. In this instance, the cooling fluid is preferably at a pressure of about 100 psia to 2,000 psia before passing through the expansion valve. More preferably the cooling fluid is at a pressure of about 200 psia to 800 psia.

For the case of dual downhole expansion valves, preferably the cooling fluid is at a pressure of about 800 psia to 4,000 psia before passing through the first expansion valve, about 100 psia to about 800 psia after passing through the first expansion valve, and about 25 to 100 psia after passing through the second expansion valve. More preferably, the cooling fluid is at a pressure of about 800 psia to 2,000 psia before passing through the first expansion valve, about 100 psia to about 500 psia after passing through the first expansion valve, and about 25 psia to about 100 psia after passing through the second expansion valve.

Also disclosed herein is a method of lowering the temperature of a subsurface formation. The method may include the steps of completing a first injection well, and also completing a second injection well adjacent the first injection well. The method also includes injecting a fracturing fluid into the first injection well so as to form a fracture at a depth of the subsurface formation. In this way, fluid communication is established between the first and second injection wells.

The method also includes injecting a cooling fluid under pressure into the first injection well and into the fracture. This serves to lower the temperature of the subsurface formation. The method further includes circulating at least a portion of the cooling fluid back up through the second injection well.

In this method, the geomechanical conditions are chosen such that the fracture is substantially vertical. The well from which the fracture is formed may by substantially vertical or substantially horizontal.

The first injection well preferably comprises an elongated tubular member that receives the cooling fluid en route to the subsurface formation. The first injection well may further comprise an expansion valve in fluid communication with the tubular member through which the cooling fluid flows to cool the subsurface formation. The expansion valve may be positioned at a selected point along the wellbore. In one instance, the expansion valve is positioned along the tubular member proximate an upper depth of the subsurface formation.

Once again, various cooling fluids may be used. In one aspect, the cooling fluid is a partially frozen salt-water mixture. The salt in the salt-water mixture may be, for example, NaCl or $CaCl_2$. The cooling fluid may alternately define a partially frozen alcohol-water mixture. The alcohol may be, for example, methanol or ethanol.

In another aspect, the cooling fluid may define a partially frozen glycol-water mixture. The glycol may be, for example, MEG, DEG, or propylene glycol. In another aspect, the cooling fluid may define a hydrocarbon mixture comprised of greater than 50 mol. percent carbon molecules of $C_7$, $C_8$, $C_9$, $C_{10}$, $C_{11}$, $C_{12}$, $C_{13}$, $C_{14}$, or mixtures thereof.

In one aspect, the cooling fluid is a slurry that comprises particles of frozen material. The particles within the cooling fluid may be formed through a process of mechanical grinding. The particles may have a composition that is different than the cooling fluid. The cooling fluid may be a mixture with a composition that is close to the eutectic composition.

In one aspect, the composition of the particles has a freezing temperature that is higher than the cooling fluid. In this instance, the particles are formed by rapidly cooling the cooling fluid below the freezing temperature of the particles, but not below the freezing temperature of the cooling fluid. In another aspect, the particles are seeded into the cooling fluid in a frozen state. The particles may comprise a biphasic material having an external portion and an internal portion such that the external portion has a higher freezing temperature than the internal portion.

For single phase cooling fluids, the fracturing fluid preferably comprises a proppant to prop the formation. For slurry cooling fluids, the fracturing fluid preferably does not contain a proppant or contains proppant particles which are at least 8 times that of the average size of the slurry particles.

Yet another method of lowering the temperature of a subsurface formation is disclosed herein. This method includes the step of completing a well having fluid communication with the subsurface formation at both a first depth and a second lower depth. A fracturing fluid is then injected into the well so as to form a substantially vertical fracture at a depth of the subsurface formation. In this way, fluid communication is provided between the first and second depths in the well. Then, a cooling fluid is circulated under pressure through the well and into the fractures. The cooling fluid flows from one depth to the other, thereby lowering the temperature of the subsurface formation.

The well may be completed substantially vertically within the subsurface formation. Alternatively, the well may be completed substantially horizontally within the subsurface formation. The fracture fluid may or may not contain proppant.

Still another method for lowering the temperature of a subsurface formation is provided herein. The method comprises injecting a cooling fluid at a first temperature into a wellbore. The wellbore is completed at or below a depth of the subsurface formation. The method also includes lowering the temperature of the cooling fluid after it has entered the wellbore. The cooling fluid is passed through the wellbore at a depth of the subsurface formation at the lower temperature. From there, the cooling fluid is circulated back to the surface.

The wellbore in this instance may comprise an elongated tubular member that receives the cooling fluid en route to the subsurface formation. The wellbore may further comprise a first expansion valve in fluid communication with the tubular member through which the cooling fluid flows. The expansion valve serves to cool the cooling fluid to the lower temperature.

A cooling wellbore is also disclosed herein. The cooling wellbore is for the purpose of lowering the temperature of a subsurface formation. The wellbore is completed at or below a depth of the subsurface formation, and in one aspect includes an elongated tubular member, and a first expansion valve. The first expansion valve is in fluid communication with the elongated tubular member. A cooling fluid is directed through the elongated tubular member and the first expansion valve in order to cool the subsurface formation.

In one aspect, the elongated tubular member is a U-tube. The first expansion valve may be positioned in the tubular member above an upper depth of the subsurface formation. Alternatively, the first expansion valve may be positioned in the tubular member proximate a lower depth of the subsurface formation. Alternatively still, the first expansion valve may be positioned in the tubular member proximate an upper depth of the subsurface formation.

In one embodiment, the wellbore further comprises an annular region formed between the elongated tubular member and a diameter of the wellbore. The cooling fluid may be circulated through the tubular member along the subsurface formation, and then back up the wellbore through the surrounding annular region.

In another embodiment, the elongated tubular member is a U-tube comprising a downward portion through which the cooling fluid flows to the subsurface formation, and an upward portion through which the cooling fluid flows back to the surface. Insulation may be placed along all or a portion of the U-tube to reduce cross heat exchange between the upward and downward flows. The cooling wellbore may further include a second expansion valve. The cooling fluid flows through the first expansion valve upon or before reaching the depth of the subsurface formation. The cooling fluid further flows through the second expansion valve at or after reaching the depth of the subsurface formation.

Various cooling fluids may be used. In one aspect, the cooling fluid comprises a liquid that wholly or partially vaporizes upon passing through the first expansion valve. In another aspect, the cooling fluid comprises a gas. The cooling fluid may be injected in a gaseous state, and remain in a substantially gaseous state when passed through the first expansion valve. Alternatively, the cooling fluid may be injected in a gaseous state, but a portion of the cooling fluid condenses from a gas to a liquid state as the cooling fluid is passed through the first expansion valve.

The injected cooling fluid may comprise at least of 50 mol. percent of propane, propylene, ethane, ethylene, or a mixture thereof. Alternatively, the cooling fluid may comprise at least of 80 mol. percent of propane, propylene, ethane, ethylene, isobutane, or a mixture thereof.

Alternatively, the injected cooling fluid may comprise at least of 50 mol. percent of a halogenated hydrocarbon. Alternatively, the cooling fluid may comprise at least 80 mol. percent of a halogenated hydrocarbon.

The cooling fluid may be chilled prior to injection into the tubular member. For instance, the cooling fluid may be chilled below ambient air temperature prior to injection into the tubular member. In any instance, the cooling fluid may be injected into the subsurface formation at a controlled rate such that the cooling fluid flows through the first expansion valve and adjacent the subsurface formation, and then leaves the subsurface formation with no more than 20 wt. % in a liquid state. Alternatively, the cooling fluid may be injected into the subsurface formation at a controlled rate such that the cooling fluid flows through the first expansion valve and adjacent the subsurface formation, and then leaves the subsurface formation with no more than 5 wt. % in a liquid state.

The cooling wellbore may be placed at various positions relative to the shale oil development area. Preferably, one or more wellbores are formed outside of or along the periphery of the area under shale oil development.

Finally, a method for forming a freeze wall within a subsurface formation is provided. In one aspect, the method includes determining a direction of least principal stress within the subsurface formation, and then forming a plurality of cooling wellbores along the direction perpendicular to said direction of least principal stress. The method also includes injecting a fracturing fluid into at least some of the cooling wellbores so as to form substantially vertical fractures at a depth of the subsurface formation. In this way, fluid communication is provided between the cooling wellbores.

In accordance with the method for forming a freeze wall, certain of the cooling wellbores are designated as injectors and certain of the cooling wellbores are designated as producers. The method includes injecting a cooling fluid under pressure into the injectors and into the fractures so as to lower the temperature of the subsurface formation. The method then includes circulating at least a portion of the cooling fluid back up through the producers.

BRIEF DESCRIPTION OF THE DRAWINGS

So that the features of the present invention can be better understood, certain drawings, graphs and flow charts are appended hereto. It is to be noted, however, that the drawings illustrate only selected embodiments of the inventions and are therefore not to be considered limiting of scope, for the inventions may admit to other equally effective embodiments and applications.

FIG. 7 is a cross-sectional view of a wellbore for a freeze well, in one embodiment. The wellbore is completed at the level of an organic-rich rock formation.

FIG. 8 is a cross-sectional view of an expansion valve, in one embodiment. This is an enlarged view of the expansion valve used in the wellbore of FIG. 7.

FIG. 9 is a cross-sectional view of an alternate arrangement for an expansion valve as might be used in the wellbore of a freeze well.

DETAILED DESCRIPTION OF CERTAIN EMBODIMENTS

Definitions

Figure 1:
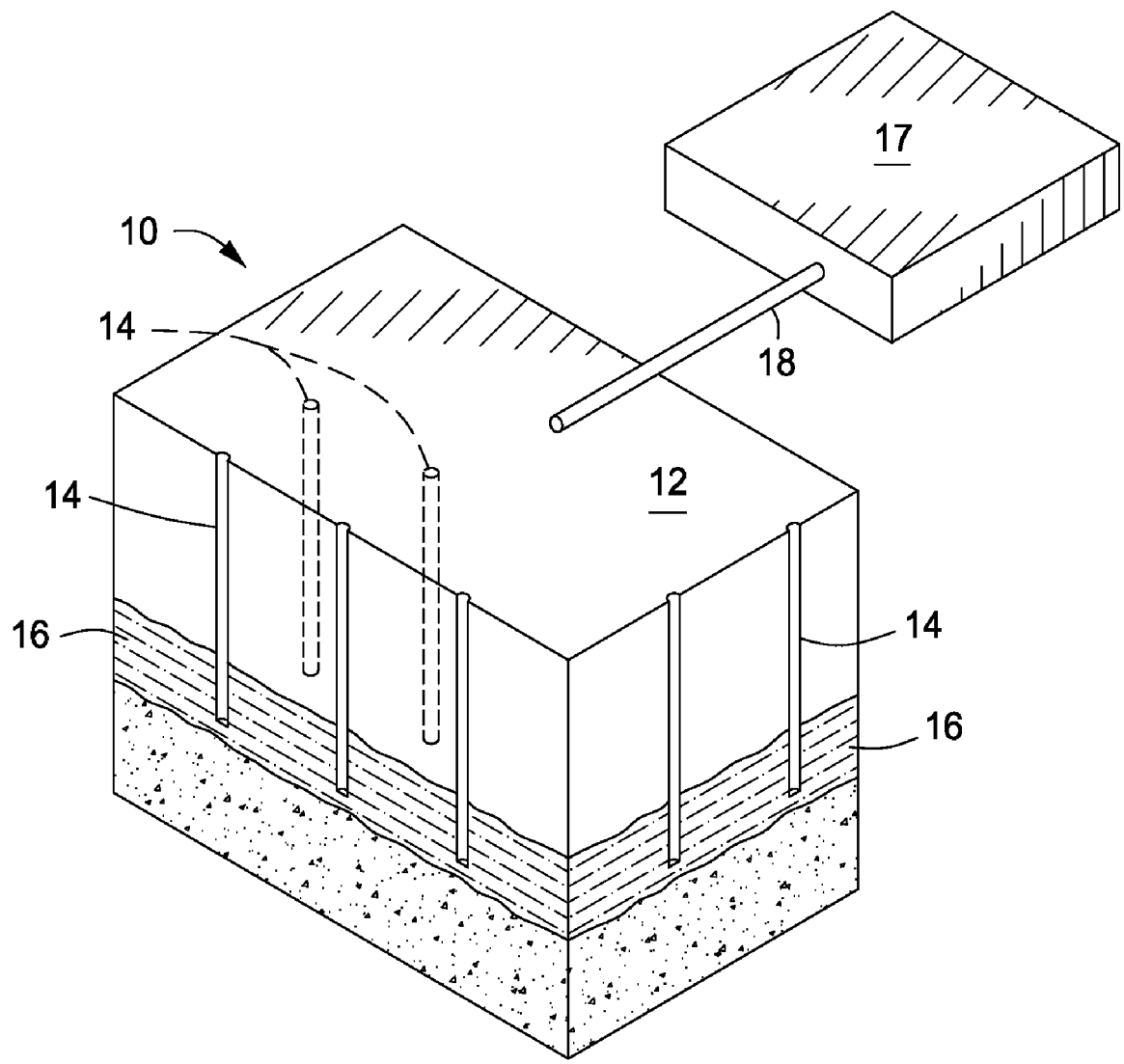
FIG. 1 is a cross-sectional view of an illustrative subsurface area. The subsurface area includes an organic-rich rock matrix that defines a subsurface formation.

As used herein, the term "hydrocarbon(s)" refers to organic material with molecular structures containing carbon bonded to hydrogen. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, pyrolyzed shale oil, synthesis gas, a pyrolysis product of coal, carbon dioxide, hydrogen sulfide and water (including steam). Produced fluids may include both hydrocarbon fluids and non-hydrocarbon fluids.

As used herein, the term "condensable hydrocarbons" means those hydrocarbons that condense at 25° C. and one atmosphere absolute pressure. Condensable hydrocarbons may include a mixture of hydrocarbons having carbon numbers greater than 4.

As used herein, the term "non-condensable hydrocarbons" means those hydrocarbons that do not condense at 25° C. and one atmosphere absolute pressure. Non-condensable hydrocarbons may include hydrocarbons having carbon numbers less than 5.

As used herein, the term "heavy hydrocarbons" refers to hydrocarbon fluids that are highly viscous at ambient conditions (15° C. and 1 atm pressure). Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20 degrees. Heavy oil, for example, generally has an API gravity of about 10-20 degrees, whereas tar generally has an API gravity below about 10 degrees. The viscosity of heavy hydrocarbons is generally greater than about 100 centipoise at 150C.

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein, the term "formation hydrocarbons" refers to both heavy hydrocarbons and solid hydrocarbons that are contained in an organic-rich rock formation. Formation hydrocarbons may be, but are not limited to, kerogen, oil shale, coal, bitumen, tar, natural mineral waxes, and asphaltites.

As used herein, the term "tar" refers to a viscous hydrocarbon that generally has a viscosity greater than about 10,000 centipoise at 15° C. The specific gravity of tar generally is greater than 1.000. Tar may have an API gravity less than 10 degrees. "Tar sands" refers to a formation that has tar in it.

As used herein, the term "kerogen" refers to a solid, insoluble hydrocarbon that principally contains carbon, hydrogen, nitrogen, oxygen, and sulfur. Oil shale contains kerogen.

As used herein, the term "bitumen" refers to a non-crystalline solid or viscous hydrocarbon material that is substantially soluble in carbon disulfide.

As used herein, the term "oil" refers to a hydrocarbon fluid containing a mixture of condensable hydrocarbons.

As used herein, the term "subsurface" refers to geologic strata occurring below the earth's surface.

As used herein, the term "hydrocarbon-rich formation" refers to any formation that contains more than trace amounts of hydrocarbons. For example, a hydrocarbon-rich formation may include portions that contain hydrocarbons at a level of greater than 5 volume percent. The hydrocarbons located in a hydrocarbon-rich formation may include, for example, oil, natural gas, heavy hydrocarbons, and solid hydrocarbons.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites. As used herein, the term "formation" refers to any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest. An overburden or underburden may include one or more different types of substantially impermeable materials. For example, overburden and/or underburden may include rock, shale, mudstone, or wet/tight carbonate (i.e., an impermeable carbonate without hydrocarbons). An overburden and/or an underburden may include a hydrocarbon-containing layer that is relatively impermeable. In some cases, the overburden and/or underburden may be permeable.

As used herein, the term "organic-rich rock formation" refers to any formation containing organic-rich rock. Organic-rich rock formations include, for example, oil shale formations, coal formations, and tar sands formations.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, the term "water-soluble minerals" refers to minerals that are soluble in water. Water-soluble minerals include, for example, nahcolite (sodium bicarbonate), soda ash (sodium carbonate), dawsonite ($NaAl(CO_3)(OH)_2$), or combinations thereof. Substantial solubility may require heated water and/or a non-neutral pH solution.

As used herein, the term "formation water-soluble minerals" refers to water-soluble minerals that are found naturally in a formation.

As used herein, the term "migratory contaminant species" refers to species that are both soluble or moveable in water or an aqueous fluid, and are considered to be potentially harmful or of concern to human health or the environment. Migratory contaminant species may include inorganic and organic contaminants. Organic contaminants may include saturated hydrocarbons, aromatic hydrocarbons, and oxygenated hydrocarbons. Inorganic contaminants may include metal contaminants, and ionic contaminants of various types that may significantly alter pH or the formation fluid chemistry. Aromatic hydrocarbons may include, for example, benzene, toluene, xylene, ethylbenzene, and tri-methylbenzene, and various types of polyaromatic hydrocarbons such as anthracenes, naphthalenes, chrysenes and pyrenes. Oxygenated hydrocarbons may include, for example, alcohols, ketones, phenols, and organic acids such as carboxylic acid. Metal contaminants may include, for example, arsenic, boron, chromium, cobalt, molybdenum, mercury, selenium, lead, vanadium, nickel or zinc. Ionic contaminants include, for example, sulfides, sulfates, chlorides, fluorides, ammonia, nitrates, calcium, iron, magnesium, potassium, lithium, boron, and strontium.

As used herein, the term "cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$ among other molecules.

As used herein, the term "sequestration" refers to the storing of a fluid that is a by-product of a process rather than discharging the fluid to the atmosphere or open environment.

As used herein, the term "subsidence" refers to a downward movement of a surface relative to an initial elevation of the surface.

As used herein, the term "thickness" of a layer refers to the distance between the upper and lower boundaries of a cross section of a layer, wherein the distance is measured normal to the average tilt of the cross section.

As used herein, the term "thermal fracture" refers to fractures created in a formation caused directly or indirectly by expansion or contraction of a portion of the formation and/or fluids within the formation, which in turn is caused by increasing/decreasing the temperature of the formation and/ or fluids within the formation, and/or by increasing/decreasing a pressure of fluids within the formation due to heating. Thermal fractures may propagate into or form in neighboring regions significantly cooler than the heated zone.

As used herein, the term "hydraulic fracture" refers to a fracture at least partially propagated into a formation, wherein the fracture is created through injection of pressurized fluids into the formation. The fracture may be artificially held open by injection of a proppant material. Hydraulic fractures may be substantially horizontal in orientation, substantially vertical in orientation, or oriented along any other plane.

As used herein, the term "wellbore" refers to a hole in the subsurface made by drilling or insertion of a conduit into the subsurface. A wellbore may have a substantially circular cross section, or other cross-sectional shapes (e.g., circles, ovals, squares, rectangles, triangles, slits, or other regular or irregular shapes). As used herein, the term "well", when referring to an opening in the formation, may be used interchangeably with the term "wellbore."

DESCRIPTION OF SPECIFIC EMBODIMENTS

The inventions described herein are in connection with certain specific embodiments. However, to the extent that the following detailed description is specific to a particular embodiment or a particular use, such is intended to be illustrative only and is not to be construed as limiting the scope of the inventions.

As discussed herein, some embodiments of the inventions include or have application related to an in situ method of recovering natural resources. The natural resources may be recovered from an organic-rich rock formation, including, for example, an oil shale formation. The organic-rich rock formation may include formation hydrocarbons, including, for example, kerogen, coal, and heavy hydrocarbons. In some embodiments of the inventions the natural resources may include hydrocarbon fluids, including, for example, products of the pyrolysis of formation hydrocarbons such as oil shale. In some embodiments of the inventions the natural resources may also include water-soluble minerals, including, for example, nahcolite (sodium bicarbonate, or $2NaHCO_3$), soda ash (sodium carbonate, or $Na_2CO_3$) and dawsonite ($NaAl(CO_3)(OH)_2$).

FIG. 1 presents a perspective view of an illustrative oil shale development area 10. A surface 12 of the development area 10 is indicated. Below the surface is an organic-rich rock formation 16. The illustrative subsurface formation 16 contains formation hydrocarbons (such as, for example, kerogen) and possibly valuable water-soluble minerals (such as, for example, nahcolite). It is understood that the representative formation 16 may be any organic-rich rock formation, including a rock matrix containing coal or tar sands, for example. In addition, the rock matrix making up the formation 16 may be permeable, semi-permeable or non-permeable. The present inventions are particularly advantageous in oil shale development areas initially having very limited or effectively no fluid permeability.

In order to access formation 16 and recover natural resources therefrom, a plurality of wellbores is formed. Wellbores are shown at 14 in FIG. 1. The representative wellbores 14 are essentially vertical in orientation relative to the surface 12. However, it is understood that some or all of the wellbores 14 could deviate into an obtuse or even horizontal orientation. In the arrangement of FIG. 1, each of the wellbores 14 is completed in the oil shale formation 16. The completions may be either open or cased hole. The well completions may also include propped or unpropped hydraulic fractures emanating therefrom.

In the view of FIG. 1, only seven wellbores 14 are shown. However, it is understood that in an oil shale development project, numerous additional wellbores 14 will most likely be drilled. The wellbores 14 may be located in relatively close proximity, being from 10 feet to up to 300 feet in separation. In some embodiments, a well spacing of 15 to 25 feet is provided. Typically, the wellbores 14 are also completed at shallow depths, being from 200 to 5,000 feet at total depth. In some embodiments the oil shale formation targeted for in situ retorting is at a depth greater than 200 feet below the surface or alternatively 400 feet below the surface. Alternatively, conversion and production of an oil shale formation occur at depths between 500 and 2,500 feet.

The wellbores 14 will be selected for certain functions and may be designated as heat injection wells, water injection wells, oil production wells and/or water-soluble mineral solution production wells. In one aspect, the wellbores 14 are dimensioned to serve two, three, or all four of these purposes. Suitable tools and equipment may be sequentially run into and removed from the wellbores 14 to serve the various purposes.

A fluid processing facility 17 is also shown schematically. The fluid processing facility 17 is equipped to receive fluids produced from the organic-rich rock formation 16 through one or more pipelines or flow lines 18. The fluid processing facility 17 may include equipment suitable for receiving and separating oil, gas and water produced from the heated formation. The fluid processing facility 17 may further include equipment for separating out dissolved water-soluble minerals and/or migratory contaminant species including, for example, dissolved organic contaminants, metal contaminants, or ionic contaminants in the produced water recovered from the organic-rich rock formation 16. The contaminants may include, for example, aromatic hydrocarbons such as benzene, toluene, xylene, and tri-methylbenzene. The contaminants may also include polyaromatic hydrocarbons such as anthracene, naphthalene, chrysene and pyrene. Metal contaminants may include species containing arsenic, boron, chromium, mercury, selenium, lead, vanadium, nickel, cobalt, molybdenum, or zinc. Ionic contaminant species may include, for example, sulfates, chlorides, fluorides, lithium, potassium, aluminum, ammonia, and nitrates.

Figure 2:
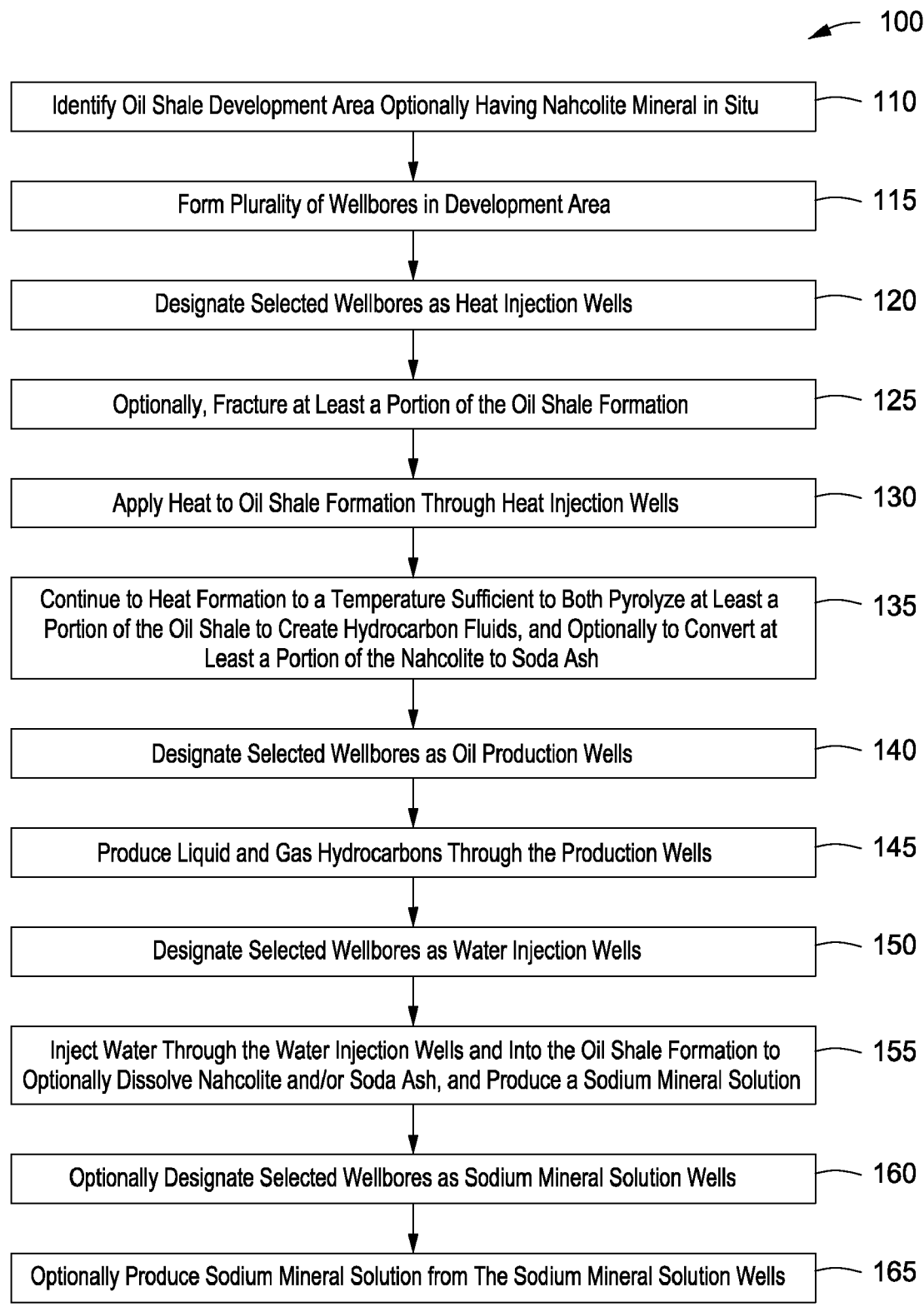
FIG. 2 is a flow chart demonstrating a general method of in situ thermal recovery of oil and gas from an organic-rich rock formation, in one embodiment.

In order to recover oil, gas, and sodium (or other) water-soluble minerals, a series of steps may be undertaken. FIG. 2 presents a flow chart demonstrating a method of in situ thermal recovery of oil and gas from an organic-rich rock formation 100, in one embodiment. It is understood that the order of some of the steps from FIG. 2 may be changed, and that the sequence of steps is merely for illustration.

First, the oil shale (or other organic-rich rock) formation 16 is identified within the development area 10. This step is shown in box 110. Optionally, the oil shale formation may contain nahcolite or other sodium minerals. The targeted development area within the oil shale formation may be identified by measuring or modeling the depth, thickness and organic richness of the oil shale as well as evaluating the position of the organic-rich rock formation relative to other rock types, structural features (e.g. faults, anticlines or synclines), or hydrogeological units (i.e. aquifers). This is accomplished by creating and interpreting maps and/or models of depth, thickness, organic richness and other data from available tests and sources. This may involve performing geological surface surveys, studying outcrops, performing seismic surveys, and/or drilling boreholes to obtain core samples from subsurface rock. Rock samples may be analyzed to assess kerogen content and hydrocarbon fluid-generating capability.

The kerogen content of the organic-rich rock formation may be ascertained from outcrop or core samples using a variety of data. Such data may include organic carbon content, hydrogen index, and modified Fischer assay analyses. Subsurface permeability may also be assessed via rock samples, outcrops, or studies of ground water flow. Furthermore the connectivity of the development area to ground water sources may be assessed.

Next, a plurality of wellbores 14 is formed across the targeted development area 10. This step is shown schematically in box 115. The purposes of the wellbores 14 are set forth above and need not be repeated. However, it is noted that for purposes of the wellbore formation step of box 115, only a portion of the wells need be completed initially. For instance, at the beginning of the project heat injection wells are needed, while a majority of the hydrocarbon production wells are not yet needed. Production wells may be brought in once conversion begins, such as after 4 to 12 months of heating.

It is understood that petroleum engineers will develop a strategy for the best depth and arrangement for the wellbores 14, depending upon anticipated reservoir characteristics, economic constraints, and work scheduling constraints. In addition, engineering staff will determine what wellbores 14 shall be used for initial formation 16 heating. This selection step is represented by box 120.

Concerning heat injection wells, there are various methods for applying heat to the organic-rich rock formation 16. The present methods are not limited to the heating technique employed unless specifically so stated in the claims. The heating step is represented generally by box 130. Preferably, for in situ processes the heating of a production zone takes place over a period of months, or even four or more years.

The formation 16 is heated to a temperature sufficient to pyrolyze at least a portion of the oil shale in order to convert the kerogen to hydrocarbon fluids. The bulk of the target zone of the formation may be heated to between 270° C. to 800° C. Alternatively, the targeted volume of the organic-rich formation is heated to at least 350° C. to create production fluids. The conversion step is represented in FIG. 2 by box 135. The resulting liquids and hydrocarbon gases may be refined into products which resemble common commercial petroleum products. Such liquid products include transportation fuels such as diesel, jet fuel and naptha. Generated gases include light alkanes, light alkenes, $H_2$, $CO_2$, CO, and $NH_3$.

Conversion of the oil shale will create permeability in the oil shale section in rocks that were originally impermeable. Preferably, the heating and conversion processes of boxes 130 and 135, occur over a lengthy period of time. In one aspect, the heating period is from three months to four or more years. Also as an optional part of box 135, the formation 16 may be heated to a temperature sufficient to convert at least a portion of nahcolite, if present, to soda ash. Heat applied to mature the oil shale and recover oil and gas will also convert nahcolite to sodium carbonate (soda ash), a related sodium mineral. The process of converting nahcolite (sodium bicarbonate) to soda ash (sodium carbonate) is described herein.

In connection with the heating step 130, the rock formation 16 may optionally be fractured to aid heat transfer or later hydrocarbon fluid production. The optional fracturing step is shown in box 125. Fracturing may be accomplished by creating thermal fractures within the formation through application of heat. By heating the organic-rich rock and transforming the kerogen to oil and gas, the permeability increases via thermal fracture formation and subsequent production of a portion of the hydrocarbon fluids generated from the kerogen. Alternatively, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability in portions of the formation and/or be used to provide a planar source for heating.

As part of the hydrocarbon fluid production process 100, certain wells 14 may be designated as oil and gas production wells. This step is depicted by box 140. Oil and gas production might not be initiated until it is determined that the kerogen has been sufficiently retorted to allow maximum recovery of oil and gas from the formation 16. In some instances, dedicated production wells are not drilled until after heat injection wells (box 130) have been in operation for a period of several weeks or months. Thus, box 140 may include the formation of additional wellbores 14. In other instances, selected heater wells are converted to production wells.

After certain wellbores 14 have been designated as oil and gas production wells, oil and/or gas is produced from the wellbores 14. The oil and/or gas production process is shown at box 145. At this stage (box 145), any water-soluble minerals, such as nahcolite and converted soda ash may remain substantially trapped in the rock formation 16 as finely disseminated crystals or nodules within the oil shale beds, and are not produced. However, some nahcolite and/or soda ash may be dissolved in the water created during heat conversion (box 135) within the formation.

Box 150 presents an optional next step in the oil and gas recovery method 100. Here, certain wellbores 14 are designated as water or aqueous fluid injection wells. Aqueous fluids are solutions of water with other species. The water may constitute "brine," and may include dissolved inorganic salts of chloride, sulfates and carbonates of Group I and II elements of The Periodic Table of Elements. Organic salts can also be present in the aqueous fluid. The water may alternatively be fresh water containing other species. The other species may be present to alter the pH. Alternatively, the other species may reflect the availability of brackish water not saturated in the species wished to be leached from the subsurface. Preferably, the water injection wells are selected from some or all of the wellbores used for heat injection or for oil and/or gas production. However, the scope of the step of box 150 may include the drilling of yet additional wellbores 14 for use as dedicated water injection wells. In this respect, it may be desirable to complete water injection wells along a periphery of the development area 10 in order to create a boundary of high pressure.

Next, optionally water or an aqueous fluid is injected through the water injection wells and into the oil shale formation 16. This step is shown at box 155. The water may be in the form of steam or pressurized hot water. Alternatively the injected water may be cool and becomes heated as it contacts the previously heated formation. The injection process may further induce fracturing. This process may create fingered caverns and brecciated zones in the nahcolite-bearing intervals some distance, for example up to 200 feet out, from the water injection wellbores. In one aspect, a gas cap, such as nitrogen, may be maintained at the top of each "cavern" to prevent vertical growth.

Along with the designation of certain wellbores 14 as water injection wells, the design engineers may also designate certain wellbores 14 as water or water-soluble mineral solution production wells. This step is shown in box 160. These wells may be the same as wells used to previously produce hydrocarbons or inject heat. These recovery wells may be used to produce an aqueous solution of dissolved water-soluble minerals and other species, including, for example, migratory contaminant species. For example, the solution may be one primarily of dissolved soda ash. This step is shown in box 165. Alternatively, single wellbores may be used to both inject water and then to recover a sodium mineral solution. Thus, box 165 includes the option of using the same wellbores 14 for both water injection and solution production (box 165).

Temporary control of the migration of the migratory contaminant species, especially during the pyrolysis process, can be obtained via placement of the injection and production wells 14 such that fluid flow out of the heated zone is minimized. Typically, this involves placing injection wells at the periphery of the heated zone so as to cause pressure gradients which prevent flow inside the heated zone from leaving the zone.

Figure 3:
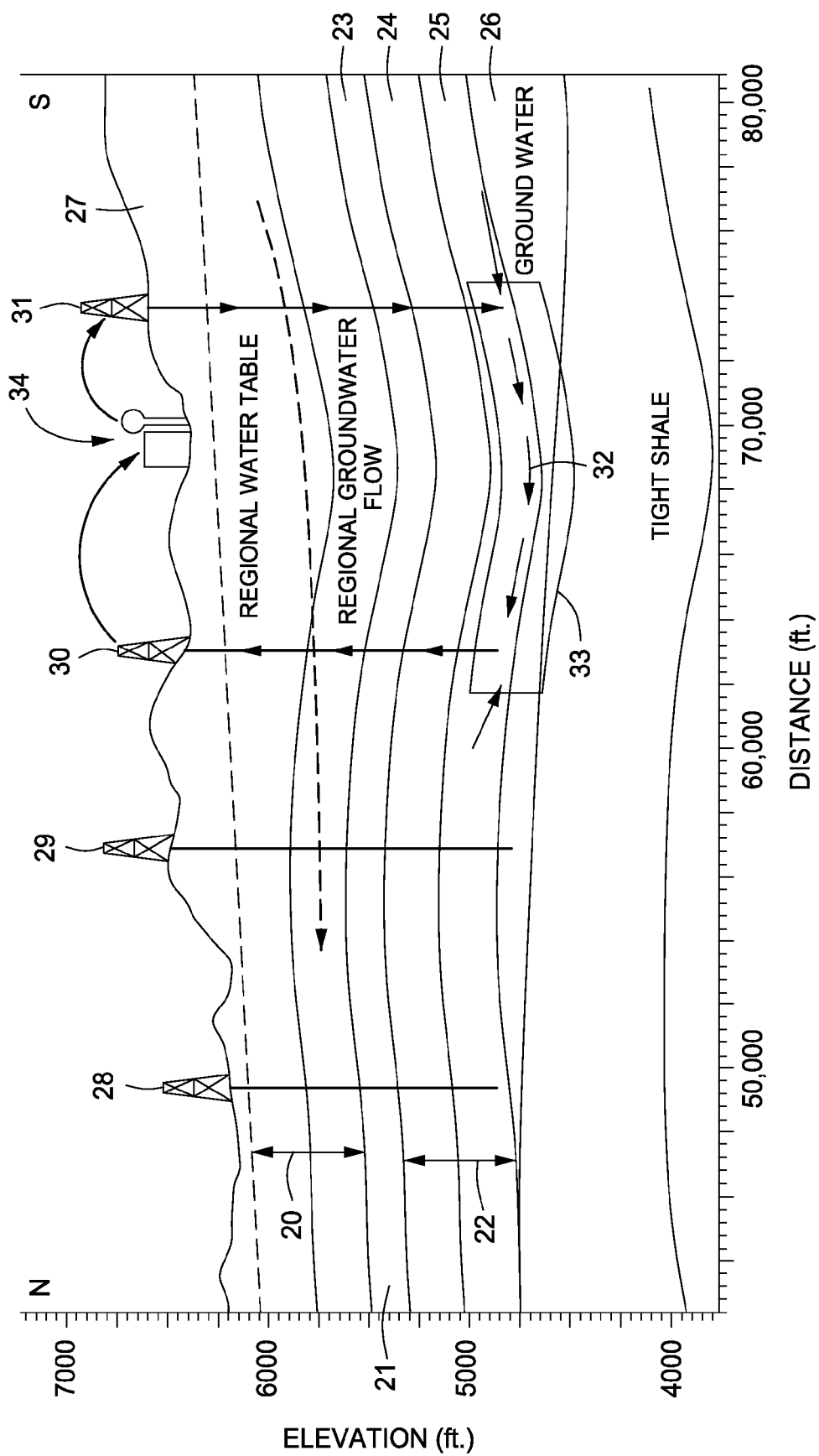
FIG. 3 is cross-sectional side view of an oil shale development indicating ground water flow.

FIG. 3 is a cross-sectional view of an illustrative oil shale formation that is within or connected to ground water aquifers and a formation leaching operation. Four separate oil shale formation zones are depicted (23, 24, 25 and 26) within the oil shale formation. The water aquifers are below the ground surface 27, and are categorized as an upper aquifer 20 and a lower aquifer 22. Intermediate the upper and lower aquifers is an aquitard 21. It can be seen that certain zones of the formation are both aquifers or aquitards and oil shale zones. A plurality of wells (28, 29, 30 and 31) is shown traversing vertically downward through the aquifers. One of the wells is serving as a water injection well 31, while another is serving as a water production well 30. In this way, water is circulated 32 through at least the lower aquifer 22.

FIG. 3 shows diagrammatically the water circulation 32 through an oil shale zone 33 that was heated, that resides within or is connected to an aquifer 22, and from which hydrocarbon fluids were previously recovered. Introduction of water via the water injection well 31 forces water into the previously heated oil shale zone 33 so that water-soluble minerals and migratory contaminants species are swept to the water production well 30. The water may then be processed in a facility 34 wherein the water-soluble minerals (e.g. nahcolite or soda ash) and the migratory contaminants may be substantially removed from the water stream. Water is then reinjected into the oil shale zone 33 and the formation leaching is repeated. This leaching with water is intended to continue until levels of migratory contaminant species are at environmentally acceptable levels within the previously heated oil shale zone 33. This may require 1 cycle, 2 cycles, 5 cycles 10 cycles or more cycles of formation leaching, where a single cycle indicates injection and production of approximately one pore volume of water.

It is understood that there may be numerous water injection and water production wells in an actual oil shale development. Moreover, the system may include monitoring wells (28 and 29) which can be utilized during the oil shale heating phase, the shale oil production phase, the leaching phase, or during any combination of these phases to monitor for migratory contaminant species and/or water-soluble minerals.

In some fields, formation hydrocarbons, such as oil shale, may exist in more than one subsurface formation. In some instances, the organic-rich rock formations may be separated by rock layers that are hydrocarbon-free or that otherwise have little or no commercial value. Therefore, it may be desirable for the operator of a field under hydrocarbon development to undertake an analysis as to which of the subsurface, organic-rich rock formations to target or in which order they should be developed.

The organic-rich rock formation may be selected for development based on various factors. One such factor is the thickness of the hydrocarbon containing layer within the formation. Greater pay zone thickness may indicate a greater potential volumetric production of hydrocarbon fluids. Each of the hydrocarbon containing layers may have a thickness that varies depending on, for example, conditions under which the formation hydrocarbon containing layer was formed. Therefore, an organic-rich rock formation will typically be selected for treatment if that formation includes at least one formation hydrocarbon-containing layer having a thickness sufficient for economical production of produced fluids.

An organic-rich rock formation may also be chosen if the thickness of several layers that are closely spaced together is sufficient for economical production of produced fluids. For example, an in situ conversion process for formation hydrocarbons may include selecting and treating a layer within an organic-rich rock formation having a thickness of greater than about 5 meters, 10 meters, 50 m, or even 100 meters. In this manner, heat losses (as a fraction of total injected heat) to layers formed above and below an organic-rich rock formation may be less than such heat losses from a thin layer of formation hydrocarbons. A process as described herein, however, may also include selecting and treating layers that may include layers substantially free of formation hydrocarbons or thin layers of formation hydrocarbons.

The richness of one or more organic-rich rock formations may also be considered. Richness may depend on many factors including the conditions under which the formation hydrocarbon containing layer was formed, an amount of formation hydrocarbons in the layer, and/or a composition of formation hydrocarbons in the layer. A thin and rich formation hydrocarbon layer may be able to produce significantly more valuable hydrocarbons than a much thicker, less rich formation hydrocarbon layer. Of course, producing hydrocarbons from a formation that is both thick and rich is desirable.

The kerogen content of an organic-rich rock formation may be ascertained from outcrop or core samples using a variety of data. Such data may include organic carbon content, hydrogen index, and modified Fischer assay analyses. The Fischer Assay is a standard method which involves heating a sample of a formation hydrocarbon containing layer to approximately 500° C. in one hour, collecting fluids produced from the heated sample, and quantifying the amount of fluids produced.

Subsurface formation permeability may also be assessed via rock samples, outcrops, or studies of ground water flow. Furthermore the connectivity of the development area to ground water sources may be assessed. Thus, an organic-rich rock formation may be chosen for development based on the permeability or porosity of the formation matrix even if the thickness of the formation is relatively thin.

Other factors known to petroleum engineers may be taken into consideration when selecting a formation for development. Such factors include depth of the perceived pay zone, stratigraphic proximity of fresh ground water to kerogen-containing zones, continuity of thickness, and other factors. For instance, the assessed fluid production content within a formation will also effect eventual volumetric production.

As noted above, several different types of wells may be used in the development of an organic-rich rock formation, including, for example, an oil shale field. For example, the heating of the organic-rich rock formation may be accomplished through the use of heater wells. The heater wells may include, for example, electrical resistance heating elements. The production of hydrocarbon fluids from the formation may be accomplished through the use of wells completed for the production of fluids. The injection of an aqueous fluid may be accomplished through the use of injection wells. Finally, the production of an aqueous solution may be accomplished through use of solution production wells.

The different wells listed above may be used for more than one purpose. Stated another way, wells initially completed for one purpose may later be used for another purpose, thereby lowering project costs and/or decreasing the time required to perform certain tasks. For example, one or more of the production wells may also be used as injection wells for later injecting water into the organic-rich rock formation. Alternatively, one or more of the production wells may also be used as solution production wells for later producing an aqueous solution from the organic-rich rock formation.

In other aspects, production wells (and in some circumstances heater wells) may initially be used as dewatering wells (e.g., before heating is begun and/or when heating is initially started). In addition, in some circumstances dewatering wells can later be used as production wells (and in some circumstances heater wells). As such, the dewatering wells may be placed and/or designed so that such wells can be later used as production wells and/or heater wells. The heater wells may be placed and/or designed so that such wells can be later used as production wells and/or dewatering wells. The production wells may be placed and/or designed so that such wells can be later used as dewatering wells and/or heater wells. Similarly, injection wells may be wells that initially were used for other purposes (e.g., heating, production, dewatering, monitoring, etc.), and injection wells may later be used for other purposes. Similarly, monitoring wells may be wells that initially were used for other purposes (e.g., heating, production, dewatering, injection, etc.). Finally, monitoring wells may later be used for other purposes such as water production.

The wellbores for the various wells may be located in relatively close proximity, being from 10 feet to up to 300 feet in separation. Alternatively, the wellbores may be spaced from 30 to 200 feet or 50 to 100 feet. Typically, the wellbores are also completed at shallow depths, being from 200 to 5,000 feet at total depth. Alternatively, the wellbores may be completed at depths from 1,000 to 4,000 feet, or 1,500 to 3,500 feet. In some embodiments, the oil shale formation targeted for in situ retorting is at a depth greater than 200 feet below the surface. In alternative embodiments, the oil shale formation targeted for in situ retorting is at a depth greater than 500, 1,000, or 1,500 feet below the surface. In alternative embodiments, the oil shale formation targeted for in situ retorting is at a depth between 200 and 5,000 feet, alternatively between 1,000 and 4,000 ft, 1,200 and 3,700 feet, or 1,500 and 3,500 feet below the surface.

It is desirable to arrange the various wells for an oil shale field in a pre-planned pattern. For instance, heater wells may be arranged in a variety of patterns including, but not limited to triangles, squares, hexagons, and other polygons. The pattern may include a regular polygon to promote uniform heating through at least the portion of the formation in which the heater wells are placed. The pattern may also be a line drive pattern. A line drive pattern generally includes a first linear array of heater wells, a second linear array of heater wells, and a production well or a linear array of production wells between the first and second linear array of heater wells. Interspersed among the heater wells are typically one or more production wells. The injection wells may likewise be disposed within a repetitive pattern of units, which may be similar to or different from that used for the heater wells.

One method to reduce the number of wells is to use a single well as both a heater well and a production well. Reduction of the number of wells by using single wells for sequential purposes can reduce project costs. One or more monitoring wells may be disposed at selected points in the field. The monitoring wells may be configured with one or more devices that measure a temperature, a pressure, and/or a property of a fluid in the wellbore. In some instances, a heater well may also serve as a monitoring well, or otherwise be instrumented.

Another method for reducing the number of heater wells is to use well patterns. Regular patterns of heater wells equidistantly spaced from a production well may be used. The patterns may form equilateral triangular arrays, hexagonal arrays, or other array patterns. The arrays of heater wells may be disposed such that a distance between each heater well is less than about 70 feet (21 m). A portion of the formation may be heated with heater wells disposed substantially parallel to a boundary of the hydrocarbon formation.

In alternative embodiments, the array of heater wells may be disposed such that a distance between each heater well may be less than about 100 feet, or 50 feet, or 30 feet. Regardless of the arrangement of or distance between the heater wells, in certain embodiments, a ratio of heater wells to production wells disposed within a organic-rich rock formation may be greater than about 5, 8, 10, 20, or more.

In one embodiment, individual production wells are surrounded by at most one layer of heater wells. This may include arrangements such as 5-spot, 7-spot, or 9-spot arrays, with alternating rows of production and heater wells. In another embodiment, two layers of heater wells may surround a production well, but with the heater wells staggered so that a clear pathway exists for the majority of flow away from the further heater wells. Flow and reservoir simulations may be employed to assess the pathways and temperature history of hydrocarbon fluids generated in situ as they migrate from their points of origin to production wells.

Figure 4:
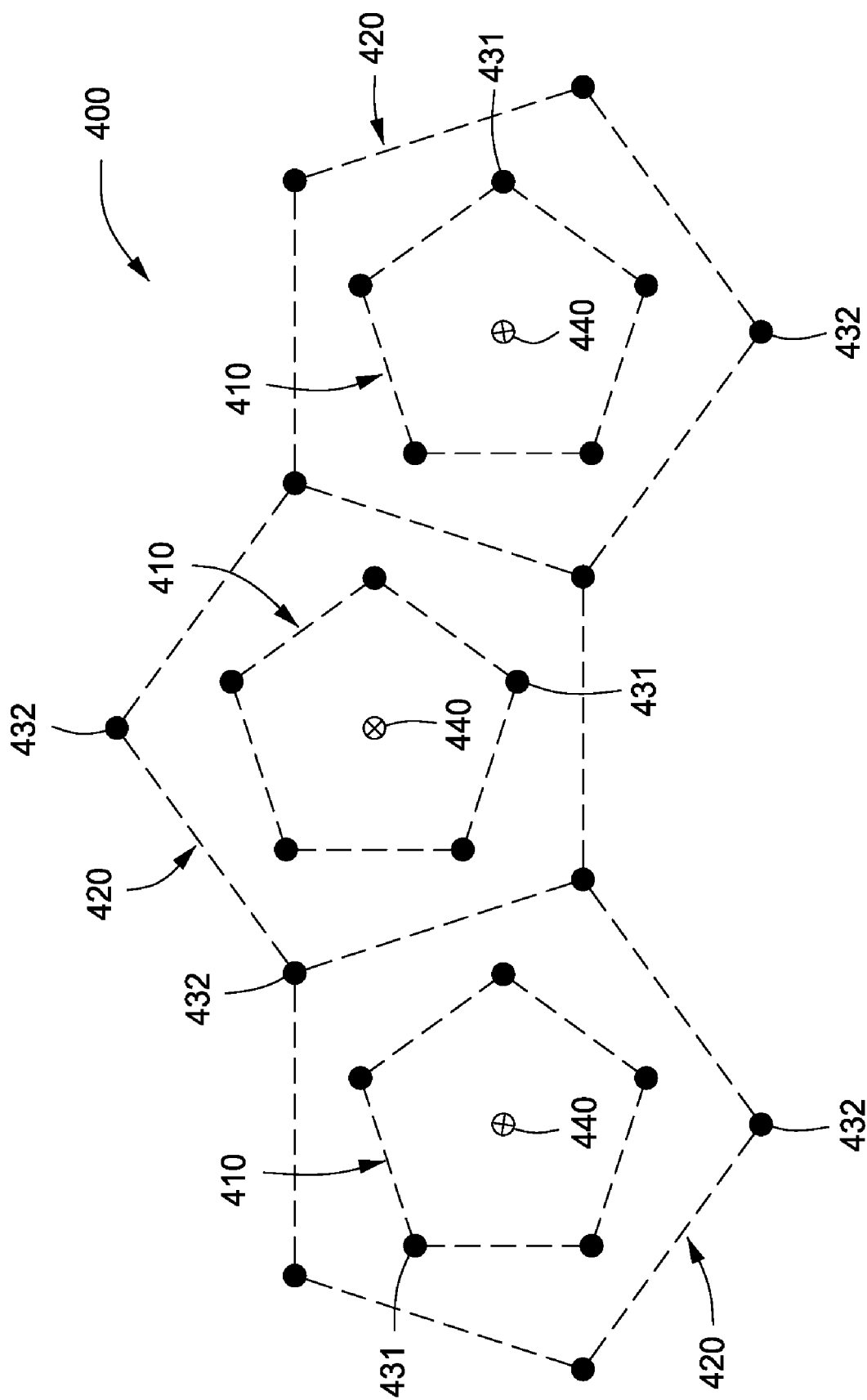
FIG. 4 provides a plan view of an illustrative heater well arrangement using more than one layer of heater wells.

FIG. 4 provides a plan view of an illustrative heater well arrangement using more than one layer of heater wells. The heater well arrangement is used in connection with the production of hydrocarbons from a shale oil development area 400. In FIG. 4, the heater well arrangement employs a first layer of heater wells 410, surrounded by a second layer of heater wells 420. The heater wells in the first layer 410 are referenced at 431, while the heater wells in the second layer 420 are referenced at 432.

A production well 440 is shown central to the well layers 410 and 420. It is noted that the heater wells 432 in the second layer 420 of wells are offset from the heater wells 431 in the first layer 410 of wells, relative to the production well 440. The purpose is to provide a flowpath for converted hydrocarbons that minimizes travel near a heater well in the first layer 410 of heater wells. This, in turn, minimizes secondary cracking of hydrocarbons converted from kerogen as hydrocarbons flow from the second layer of wells 420 to the production wells 440.

In the illustrative arrangement of FIG. 4, the first layer 410 and the second layer 420 each defines a 5-spot pattern. However, it is understood that other patterns may be employed, such as 3-spot or 6-spot patterns. In any instance, a plurality of heater wells 431 comprising a first layer of heater wells 410 is placed around a production well 440, with a second plurality of heater wells 432 comprising a second layer of heater wells 420 placed around the first layer 410.

The heater wells in the two layers also may be arranged such that the majority of hydrocarbons generated by heat from each heater well 432 in the second layer 420 are able to migrate to a production well 440 without passing substantially near a heater well 431 in the first layer 410. The heater wells 431, 432 in the two layers 410, 420 further may be arranged such that the majority of hydrocarbons generated by heat from each heater well 432 in the second layer 420 are able to migrate to the production well 440 without passing through a zone of substantially increasing formation temperature.

One method to reduce the number of heater wells is to use well patterns that are elongated in a particular direction, particularly in the direction of most efficient thermal conductivity. Heat convection may be affected by various factors such as bedding planes and stresses within the formation. For instance, heat convection may be more efficient in the direction perpendicular to the least horizontal principal stress on the formation. In some instanced, heat convection may be more efficient in the direction parallel to the least horizontal principal stress.

In connection with the development of an oil shale field, it may be desirable that the progression of heat through the subsurface in accordance with steps 130 and 135 be uniform. However, for various reasons the heating and maturation of formation hydrocarbons in a subsurface formation may not proceed uniformly despite a regular arrangement of heater and production wells. Heterogeneities in the oil shale properties and formation structure may cause certain local areas to be more or less productive. Moreover, formation fracturing which occurs due to the heating and maturation of the oil shale can lead to an uneven distribution of preferred pathways and, thus, increase flow to certain production wells and reduce flow to others. Uneven fluid maturation may be an undesirable condition since certain subsurface regions may receive more heat energy than necessary where other regions receive less than desired. This, in turn, leads to the uneven flow and recovery of production fluids. Produced oil quality, overall production rate, and/or ultimate recoveries may be reduced.

To detect uneven flow conditions, production and heater wells may be instrumented with sensors. Sensors may include equipment to measure temperature, pressure, flow rates, and/or compositional information. Data from these sensors can be processed via simple rules or input to detailed simulations to reach decisions on how to adjust heater and production wells to improve subsurface performance. Production well performance may be adjusted by controlling backpressure or throttling on the well. Heater well performance may also be adjusted by controlling energy input. Sensor readings may also sometimes imply mechanical problems with a well or downhole equipment which requires repair, replacement, or abandonment.

In one embodiment, flow rate, compositional, temperature and/or pressure data are utilized from two or more wells as inputs to a computer algorithm to control heating rate and/or production rates. Unmeasured conditions at or in the neighborhood of the well are then estimated and used to control the well. For example, in situ fracturing behavior and kerogen maturation are estimated based on thermal, flow, and compositional data from a set of wells. In another example, well integrity is evaluated based on pressure data, well temperature data, and estimated in situ stresses. In a related embodiment the number of sensors is reduced by equipping only a subset of the wells with instruments, and using the results to interpolate, calculate, or estimate conditions at uninstrumented wells. Certain wells may have only a limited set of sensors (e.g., wellhead temperature and pressure only) where others have a much larger set of sensors (e.g., wellhead temperature and pressure, bottomhole temperature and pressure, production composition, flow rate, electrical signature, casing strain, etc.).

As noted above, there are various methods for applying heat to an organic-rich rock formation. For example, one method may include electrical resistance heaters disposed in a wellbore or outside of a wellbore. One such method involves the use of electrical resistive heating elements in a cased or uncased wellbore. Electrical resistance heating involves directly passing electricity through a conductive material such that resistive losses cause it to heat the conductive material. Other heating methods include the use of downhole combustors, in situ combustion, radio-frequency (RF) electrical energy, or microwave energy. Still others include injecting a hot fluid into the oil shale formation to directly heat it. The hot fluid may or may not be circulated. One method may include generating heat by burning a fuel external to or within a subsurface formation. For example, heat may be supplied by surface burners or downhole burners or by circulating hot fluids (such as methane gas or naphtha) into the formation through, for example, wellbores via, for example, natural or artificial fractures. Some burners may be configured to perform flameless combustion. Alternatively, some methods may include combusting fuel within the formation such as via a natural distributed combustor, which generally refers to a heater that uses an oxidant to oxidize at least a portion of the carbon in the formation to generate heat, and wherein the oxidation takes place in a vicinity proximate to a wellbore. The present methods are not limited to the heating technique employed unless so stated in the claims.

One method for formation heating involves the use of electrical resistors in which an electrical current is passed through a resistive material which dissipates the electrical energy as heat. This method is distinguished from dielectric heating in which a high-frequency oscillating electric current induces electrical currents in nearby materials and causes them to heat. The electric heater may include an insulated conductor, an elongated member disposed in the opening, and/or a conductor disposed in a conduit. An early patent disclosing the use of electrical resistance heaters to produce oil shale in situ is U.S. Pat. No. 1,666,488. The '488 patent issued to Crawshaw in 1928. Since 1928, various designs for downhole electrical heaters have been proposed. Illustrative designs are presented in U.S. Pat. No. 1,701,884, U.S. Pat. No. 3,376,403, U.S. Pat. No. 4,626,665, U.S. Pat. No. 4,704,514, and U.S. Pat. No. 6,023,554).

A review of application of electrical heating methods for heavy oil reservoirs is given by R. Sierra and S. M. Farouq Ali, "Promising Progress in Field Application of Reservoir Electrical Heating Methods", Society of Petroleum Engineers Paper 69709, 2001. The entire disclosure of this reference is hereby incorporated by reference.

Certain previous designs for in situ electrical resistance heaters utilized solid, continuous heating elements (e.g., metal wires or strips). However, such elements may lack the necessary robustness for long-term, high temperature applications such as oil shale maturation. As the formation heats and the oil shale matures, significant expansion of the rock occurs. This leads to high stresses on wells intersecting the formation. These stresses can lead to bending and stretching of the wellbore pipe and internal components. Cementing (e.g., U.S. Pat. No. 4,886,118) or packing (e.g., U.S. Pat. No. 2,732,195) a heating element in place may provide some protection against stresses, but some stresses may still be transmitted to the heating element.

As an alternative, international patent publication WO 2005/010320 teaches the use of electrically conductive fractures to heat the oil shale. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation along longitudinal, horizontal planes formed by horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity. The WO 2005/010320 process creates an "in situ toaster" that artificially matures oil shale through the application of electric heat. Thermal conduction heats the oil shale to conversion temperatures in excess of 300° C. causing artificial maturation.

International patent publication WO 2005/045192 teaches an alternative heating means that employs the circulation of a heated fluid within an oil shale formation. In the process of WO 2005/045192 supercritical heated naphtha may be circulated through fractures in the formation. This means that the oil shale is heated by circulating a dense, hot hydrocarbon vapor through sets of closely-spaced hydraulic fractures. In one aspect, the fractures are horizontally formed and conventionally propped. Fracture temperatures of 320°-400° C. are maintained for up to five to ten years. Vaporized naptha may be the preferred heating medium due to its high volumetric heat capacity, ready availability and relatively low degradation rate at the heating temperature. In the WO 2005/045192 process, as the kerogen matures, fluid pressure will drive the generated oil to the heated fractures, where it will be produced with the cycling hydrocarbon vapor.

The purpose for heating the organic-rich rock formation is to pyrolyze at least a portion of the solid formation hydrocarbons to create hydrocarbon fluids. The solid formation hydrocarbons may be pyrolyzed in situ by raising the organic-rich rock formation, (or zones within the formation), to a pyrolyzation temperature. In certain embodiments, the temperature of the formation may be slowly raised through the pyrolysis temperature range. For example, an in situ conversion process may include heating at least a portion of the organic-rich rock formation to raise the average temperature of the zone above about 270° C. at a rate less than a selected amount (e.g., about 10° C., 5° C.; 3° C., 1° C., 0.5° C., or 0.1° C.) per day. In a further embodiment, the portion may be heated such that an average temperature of the selected zone may be less than about 375° C. or, in some embodiments, less than about 400° C. The formation may be heated such that a temperature within the formation reaches (at least) an initial pyrolyzation temperature (e.g., a temperature at the lower end of the temperature range where pyrolyzation begins to occur.

The pyrolysis temperature range may vary depending on the types of formation hydrocarbons within the formation, the heating methodology, and the distribution of heating sources. For example, a pyrolysis temperature range may include temperatures between about 270° C. and about 900° C. Alternatively, the bulk of the target zone of the formation may be heated to between 300° to 600° C. In an alternative embodiment, a pyrolysis temperature range may include temperatures between about 270° C. to about 500° C.

Preferably, for in situ processes the heating of a production zone takes place over a period of months, or even four or more years. Alternatively, the formation may be heated for one to fifteen years, alternatively, 3 to 10 years, 1.5 to 7 years, or 2 to 5 years. The bulk of the target zone of the formation may be heated to between 270° to 800° C. Preferably, the bulk of the target zone of the formation is heated to between 300° to 600° C. Alternatively, the bulk of the target zone is ultimately heated to a temperature below 400° C. (752° F.).

In certain embodiments of the methods of the present invention, downhole burners may be used to heat a targeted oil shale zone. Downhole burners of various design have been discussed in the patent literature for use in oil shale and other largely solid hydrocarbon deposits. Examples include U.S. Pat. No. 2,887,160; U.S. Pat. No. 2,847,071; U.S. Pat. No. 2,895,555; U.S. Pat. No. 3,109,482; U.S. Pat. No. 3,225,829; U.S. Pat. No. 3,241,615; U.S. Pat. No. 3,254,721; U.S. Pat. No. 3,127,936; U.S. Pat. No. 3,095,031; U.S. Pat. No. 5,255, 742; and U.S. Pat. No. 5,899,269. Downhole burners operate through the transport of a combustible fuel (typically natural gas) and an oxidizer (typically air) to a subsurface position in a wellbore. The fuel and oxidizer react downhole to generate heat. The combustion gases are removed (typically by transport to the surface, but possibly via injection into the formation). Oftentimes, downhole burners utilize pipe-in-pipe arrangements to transport fuel and oxidizer downhole, and then to remove the flue gas back up to the surface. Some downhole burners generate a flame, while others may not.

The use of downhole burners is an alternative to another form of downhole heat generation called steam generation. In downhole steam generation, a combustor in the well is used to boil water placed in the wellbore for injection into the formation. Applications of the downhole heat technology have been described in F. M. Smith, "A Down-hole burner—Versatile tool for well heating," 25$^{th}$ Technical Conference on Petroleum Production, Pennsylvania State University, pp 275-285 (Oct. 19-21, 1966); H. Brandt, W. G. Poynter, and J. D. Hummell, "Stimulating Heavy Oil Reservoirs with Downhole Air-Gas Burners," World Oil, pp. 91-95 (September 1965); and C. I. DePriester and A. J. Pantaleo, "Well Stimulation by Downhole Gas-Air Burner," Journal of Petroleum Technology, pp. 1297-1302 (December 1963).

Downhole burners have advantages over electrical heating methods due to the reduced infrastructure cost. In this respect, there is no need for an expensive electrical power plant and distribution system. Moreover, there is increased thermal efficiency because the energy losses inherently experienced during electrical power generation are avoided.

Few applications of downhole burners exist due to various design issues. Downhole burner design issues include temperature control and metallurgy limitations. In this respect, the flame temperature can overheat the tubular and burner hardware and cause them to fail via melting, thermal stresses, severe loss of tensile strength, or creep. Certain stainless steels, typically with high chromium content, can tolerate temperatures up to ~700° C. for extended periods. (See for example H. E. Boyer and T. L. Gall (eds.), *Metals Handbook*, "Chapter 16: Heat-Resistant Materials", American Society for Metals, (1985.) The existence of flames can cause hot spots within the burner and in the formation surrounding the burner. This is due to radiant heat transfer from the luminous portion of the flame. However, a typical gas flame can produce temperatures up to about 1,650° C. Materials of construction for the burners must be sufficient to withstand the temperatures of these hot spots. The heaters are therefore more expensive than a comparable heater without flames.

For downhole burner applications, heat transfer can occur in one of several ways. These include conduction, convection, and radiative methods. Radiative heat transfer can be particularly strong for an open flame. Additionally, the flue gases can be corrosive due to the $CO_2$ and water content. Use of refractory metals or ceramics can help solve these problems, but typically at a higher cost. Ceramic materials with acceptable strength at temperatures in excess of 900° C. are generally high alumina content ceramics. Other ceramics that may be useful include chrome oxide, zirconia oxide, and magnesium oxide based ceramics. Additionally, depending on the nature of the downhole combustion $NO_x$ generation may be significant.

Heat transfer in a pipe-in-pipe arrangement for a downhole burner can also lead to difficulties. The down going fuel and air will heat exchange with the up going hot flue gases. In a well there is minimal room for a high degree of insulation and hence significant heat transfer is typically expected. This cross heat exchange can lead to higher flame temperatures as the fuel and air become preheated. Additionally, the cross heat exchange can limit the transport of heat downstream of the burner since the hot flue gases may rapidly lose heat energy to the rising cooler flue gases.

In the production of oil and gas resources, it may be desirable to use the produced hydrocarbons as a source of power for ongoing operations. This may be applied to the development of oil and gas resources from oil shale. In this respect, when electrically resistive heaters are used in connection with in situ shale oil recovery, large amounts of power are required.

Electrical power may be obtained from turbines that turn generators. It may be economically advantageous to power the gas turbines by utilizing produced gas from the field. However, such produced gas must be carefully controlled so not to damage the turbine, cause the turbine to misfire, or generate excessive pollutants (e.g., $NO_x$).

One source of problems for gas turbines is the presence of contaminants within the fuel. Contaminants include solids, water, heavy components present as liquids, and hydrogen sulfide. Additionally, the combustion behavior of the fuel is important. Combustion parameters to consider include heating value, specific gravity, adiabatic flame temperature, flammability limits, autoignition temperature, autoignition delay time, and flame velocity. Wobbe Index (WI) is often used as a key measure of fuel quality. WI is equal to the ratio of the lower heating value to the square root of the gas specific gravity. Control of the fuel's Wobbe Index to a target value and range of, for example, ±10% or ±20% can allow simplified turbine design and increased optimization of performance.

Fuel quality control may be useful for shale oil developments where the produced gas composition may change over the life of the field and where the gas typically has significant amounts of $CO_2$, CO, and $H_2$ in addition to light hydrocarbons. Commercial scale oil shale retorting is expected to produce a gas composition that changes with time.

Inert gases in the turbine fuel can increase power generation by increasing mass flow while maintaining a flame temperature in a desirable range. Moreover inert gases can lower flame temperature and thus reduce $NO_x$ pollutant generation. Gas generated from oil shale maturation may have significant $CO_2$ content. Therefore, in certain embodiments of the production processes, the $CO_2$ content of the fuel gas is adjusted via separation or addition in the surface facilities to optimize turbine performance.

Achieving a certain hydrogen content for low-BTU fuels may also be desirable to achieve appropriate burn properties. In certain embodiments of the processes herein, the $H_2$ content of the fuel gas is adjusted via separation or addition in the surface facilities to optimize turbine performance. Adjustment of $H_2$ content in non-shale oil surface facilities utilizing low BTU fuels has been discussed in the patent literature (e.g., U.S. Pat. No. 6,684,644 and U.S. Pat. No. 6,858,049, the entire disclosures of which are hereby incorporated by reference).

The process of heating formation hydrocarbons within an organic-rich rock formation, for example, by pyrolysis, may generate fluids. The heat-generated fluids may include water which is vaporized within the formation. In addition, the action of heating kerogen produces pyrolysis fluids which tend to expand upon heating. The produced pyrolysis fluids may include not only water, but also, for example, hydrocarbons, oxides of carbon, ammonia, molecular nitrogen, and molecular hydrogen. Therefore, as temperatures within a heated portion of the formation increase, a pressure within the heated portion may also increase as a result of increased fluid generation, molecular expansion, and vaporization of water. Thus, some corollary exists between subsurface pressure in an oil shale formation and the fluid pressure generated during pyrolysis. This, in turn, indicates that formation pressure may be monitored to detect the progress of a kerogen conversion process.

The pressure within a heated portion of an organic-rich rock formation depends on other reservoir characteristics. These may include, for example, formation depth, distance from a heater well, a richness of the formation hydrocarbons within the organic-rich rock formation, the degree of heating, and/or a distance from a producer well.

It may be desirable for the developer of an oil shale field to monitor formation pressure during development. Pressure within a formation may be determined at a number of different locations. Such locations may include, but may not be limited to, at a wellhead and at varying depths within a wellbore. In some embodiments, pressure may be measured at a producer well. In an alternate embodiment, pressure may be measured at a heater well. In still another embodiment, pressure may be measured downhole of a dedicated monitoring well.

The process of heating an organic-rich rock formation to a pyrolysis temperature range not only will increase formation pressure, but will also increase formation permeability. The pyrolysis temperature range should be reached before substantial permeability has been generated within the organic-rich rock formation. An initial lack of permeability may prevent the transport of generated fluids from a pyrolysis zone within the formation. In this manner, as heat is initially transferred from a heater well to an organic-rich rock formation, a fluid pressure within the organic-rich rock formation may increase proximate to that heater well. Such an increase in fluid pressure may be caused by, for example, the generation of fluids during pyrolysis of at least some formation hydrocarbons in the formation.

Alternatively, pressure generated by expansion of pyrolysis fluids or other fluids generated in the formation may be allowed to increase. This assumes that an open path to a production well or other pressure sink does not yet exist in the formation. In one aspect, a fluid pressure may be allowed to increase to or above a lithostatic stress. In this instance, fractures in the hydrocarbon containing formation may form when the fluid pressure equals or exceeds the lithostatic stress. For example, fractures may form from a heater well to a production well. The generation of fractures within the heated portion may reduce pressure within the portion due to the production of produced fluids through a production well.

Once pyrolysis has begun within an organic-rich rock formation, fluid pressure may vary depending upon various factors. These include, for example, thermal expansion of hydrocarbons, generation of pyrolysis fluids, rate of conversion, and withdrawal of generated fluids from the formation. For example, as fluids are generated within the formation, fluid pressure within the pores may increase. Removal of generated fluids from the formation may then decrease the fluid pressure within the near wellbore region of the formation.

In certain embodiments, a mass of at least a portion of an organic-rich rock formation may be reduced due, for example, to pyrolysis of formation hydrocarbons and the production of hydrocarbon fluids from the formation. As such, the permeability and porosity of at least a portion of the formation may increase. Any in situ method that effectively produces oil and gas from oil shale will create permeability in what was originally a very low permeability rock. The extent to which this will occur is illustrated by the large amount of expansion that must be accommodated if fluids generated from kerogen are unable to flow. The concept is illustrated in FIG. 5.

Figure 5:
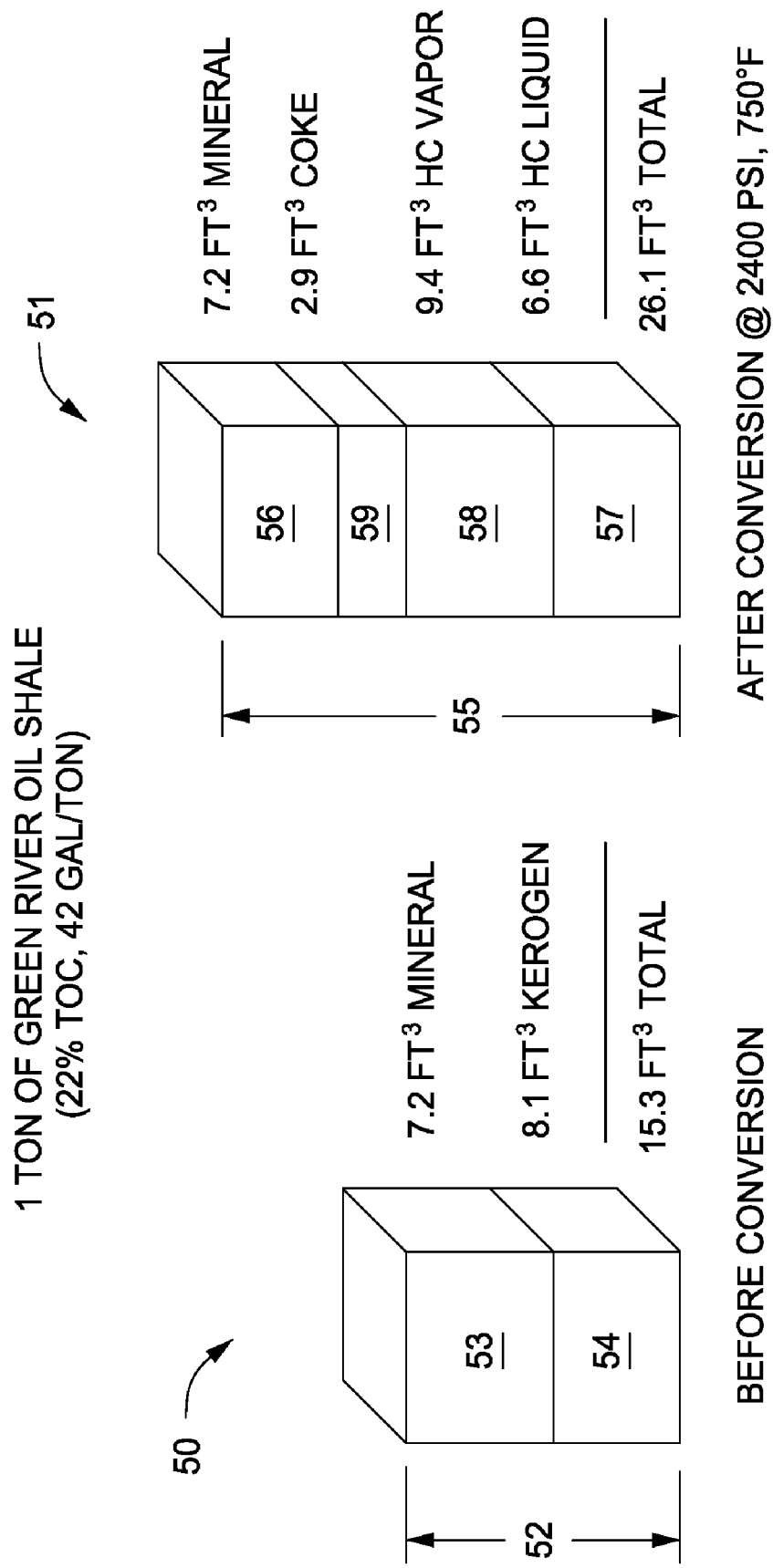
FIG. 5 is a bar chart comparing one ton of Green River oil shale before and after a simulated in situ, retorting process.

FIG. 5 provides a bar chart comparing one ton of Green River oil shale before 50 and after 51 a simulated in situ, retorting process. The simulated process was carried out at 2,400 psi and 750° F. on oil shale having a total organic carbon content of 22 wt. % and a Fisher assay of 42 gallons/ton. Before the conversion, a total of 15.3 ft$^3$ of rock matrix 52 existed. This matrix comprised 7.2 ft$^3$ of mineral 53, i.e., dolomite, limestone, etc., and 8.1 ft$^3$ of kerogen 54 imbedded within the shale. As a result of the conversion the material expanded to 26.1 ft$^3$ 55. This represented 7.2 ft$^3$ of mineral 56 (the same number as before the conversion), 6.6 ft$^3$ of hydrocarbon liquid 57, 9.4 ft$^3$ of hydrocarbon vapor 58, and 2.9 ft$^3$ of coke 59. It can be seen that substantial volume expansion occurred during the conversion process. This, in turn, increases permeability of the rock structure.

In an embodiment, heating a portion of an organic-rich rock formation in situ to a pyrolysis temperature may increase permeability of the heated portion. For example, permeability may increase due to formation of thermal fractures within the heated portion caused by application of heat. As the temperature of the heated portion increases, water may be removed due to vaporization. The vaporized water may escape and/or be removed from the formation. In addition, permeability of the heated portion may also increase as a result of production of hydrocarbon fluids from pyrolysis of at least some of the formation hydrocarbons within the heated portion on a macroscopic scale.

Certain systems and methods described herein may be used to treat formation hydrocarbons in at least a portion of a relatively low permeability formation (e.g., in "tight" formations that contain formation hydrocarbons). Such formation hydrocarbons may be heated to pyrolyze at least some of the formation hydrocarbons in a selected zone of the formation. Heating may also increase the permeability of at least a portion of the selected zone. Hydrocarbon fluids generated from pyrolysis may be produced from the formation, thereby further increasing the formation permeability.

Permeability of a selected zone within the heated portion of the organic-rich rock formation may also rapidly increase while the selected zone is heated by conduction. For example, permeability of an impermeable organic-rich rock formation may be less than about 0.1 millidarcy before heating. In some embodiments, pyrolyzing at least a portion of organic-rich rock formation may increase permeability within a selected zone of the portion to greater than about 10 millidarcies, 100 millidarcies, 1 Darcy, 10 Darcies, 20 Darcies, or 50 Darcies. Therefore, a permeability of a selected zone of the portion may increase by a factor of more than about 10, 100, 1,000, 10,000, or 100,000. In one embodiment, the organic-rich rock formation has an initial total permeability less than 1 millidarcy, alternatively less than 0.1 or 0.01 millidarcies, before heating the organic-rich rock formation. In one embodiment, the organic-rich rock formation has a post heating total permeability of greater than 1 millidarcy, alternatively, greater than 10, 50 or 100 millidarcies, after heating the organic-rich rock formation.

In connection with the heating step 130, the organic-rich rock formation may optionally be fractured to aid heat transfer or hydrocarbon fluid production. In one instance, fracturing may be accomplished naturally by creating thermal fractures within the formation through application of heat. Thermal fracture formation is caused by thermal expansion of the rock and fluids and by chemical expansion of kerogen transforming into oil and gas. Thermal fracturing can occur both in the immediate region undergoing heating, and in cooler neighboring regions. The thermal fracturing in the neighboring regions is due to propagation of fractures and tension stresses developed due to the expansion in the hotter zones. Thus, by both heating the organic-rich rock and transforming the kerogen to oil and gas, the permeability is increased not only from fluid formation and vaporization, but also via thermal fracture formation. The increased permeability aids fluid flow within the formation and production of the hydrocarbon fluids generated from the kerogen.

In addition, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability and/or be used to provide an extended geometry for a heater well. The WO 2005/010320 patent publication incorporated above describes one such method.

In connection with the production of hydrocarbons from a rock matrix, particularly those of shallow depth, a concern may exist with respect to earth subsidence. This is particularly true in the in situ heating of organic-rich rock where a portion of the matrix itself is thermally converted and removed. Initially, the formation may contain formation hydrocarbons in solid form, such as, for example, kerogen. The formation may also initially contain water-soluble minerals. Initially, the formation may also be substantially impermeable to fluid flow. The in situ heating of the matrix pyrolyzes at least a portion of the formation hydrocarbons to create hydrocarbon fluids. This, in turn, creates permeability within a matured (pyrolyzed) organic-rich rock zone in the organic-rich rock formation. The combination of pyrolyzation and increased permeability permits hydrocarbon fluids to be produced from the formation. At the same time, the loss of supporting matrix material also creates the potential for subsidence relative to the earth surface.

In some instances, subsidence is sought to be minimized in order to avoid environmental or hydrogeological impact. In this respect, changing the contour and relief of the earth surface, even by a few inches, can change runoff patterns, affect vegetation patterns, and impact watersheds. In addition, subsidence has the potential of damaging production or heater wells formed in a production area. Such subsidence can create damaging hoop and compressional stresses on wellbore casings, cement jobs, and equipment downhole.

In order to avoid or minimize subsidence, it is proposed to leave selected portions of the formation hydrocarbons substantially unpyrolyzed. This serves to preserve one or more unmatured, organic-rich rock zones. In some embodiments, the unmatured organic-rich rock zones may be shaped as substantially vertical pillars extending through a substantial portion of the thickness of the organic-rich rock formation.

The heating rate and distribution of heat within the formation may be designed and implemented to leave sufficient unmatured pillars to prevent subsidence. In one aspect, heat injection wellbores are formed in a pattern such that untreated pillars of oil shale are left therebetween to support the overburden and prevent subsidence.

It is preferred that thermal recovery of oil and gas be conducted before any solution mining of nahcolite or other water-soluble minerals present in the formation. Solution mining can generate large voids in a rock formation and collapse breccias in an oil shale development area. These voids and brecciated zones may pose problems for in situ and mining recovery of oil shale, further increasing the utility of supporting pillars.

In some embodiments, compositions and properties of the hydrocarbon fluids produced by an in situ conversion process may vary depending on, for example, conditions within an organic-rich rock formation. Controlling heat and/or heating rates of a selected section in an organic-rich rock formation may increase or decrease production of selected produced fluids.

In one embodiment, operating conditions may be determined by measuring at least one property of the organic-rich rock formation. The measured properties may be input into a computer executable program. At least one property of the produced fluids selected to be produced from the formation may also be input into the computer executable program. The program may be operable to determine a set of operating conditions from at least the one or more measured properties. The program may also be configured to determine the set of operating conditions from at least one property of the selected produced fluids. In this manner, the determined set of operating conditions may be configured to increase production of selected produced fluids from the formation.

Certain heater well embodiments may include an operating system that is coupled to any of the heater wells such as by insulated conductors or other types of wiring. The operating system may be configured to interface with the heater well. The operating system may receive a signal (e.g., an electromagnetic signal) from a heater that is representative of a temperature distribution of the heater well. Additionally, the operating system may be further configured to control the heater well, either locally or remotely. For example, the operating system may alter a temperature of the heater well by altering a parameter of equipment coupled to the heater well. Therefore, the operating system may monitor, alter, and/or control the heating of at least a portion of the formation.

In some embodiments, a heater well may be turned down and/or off after an average temperature in a formation may have reached a selected temperature. Turning down and/or off the heater well may reduce input energy costs, substantially inhibit overheating of the formation, and allow heat to substantially transfer into colder regions of the formation. Temperature (and average temperatures) within a heated organic-rich rock formation may vary, depending on, for example, proximity to a heater well, thermal conductivity and thermal diffusivity of the formation, type of reaction occurring, type of formation hydrocarbon, and the presence of water within the organic-rich rock formation. At points in the field where monitoring wells are established, temperature measurements may be taken directly in the wellbore. Further, at heater wells the temperature of the immediately surrounding formation is fairly well understood. However, it is desirable to interpolate temperatures to points in the formation intermediate temperature sensors and heater wells.

In accordance with one aspect of the production processes of the present inventions, a temperature distribution within the organic-rich rock formation may be computed using a numerical simulation model. The numerical simulation model may calculate a subsurface temperature distribution through interpolation of known data points and assumptions of formation conductivity. In addition, the numerical simulation model may be used to determine other properties of the formation under the assessed temperature distribution. For example, the various properties of the formation may include, but are not limited to, permeability of the formation.

The numerical simulation model may also include assessing various properties of a fluid formed within an organic-rich rock formation under the assessed temperature distribution. For example, the various properties of a formed fluid may include, but are not limited to, a cumulative volume of a fluid formed in the formation, fluid viscosity, fluid density, and a composition of the fluid formed in the formation. Such a simulation may be used to assess the performance of a commercial-scale operation or small-scale field experiment. For example, a performance of a commercial-scale development may be assessed based on, but not limited to, a total volume of product that may be produced from a research-scale operation.

Some embodiments include producing at least a portion of the hydrocarbon fluids from the organic-rich rock formation. The hydrocarbon fluids may be produced through production wells. Production wells may be cased or uncased wells and drilled and completed through methods known in the art.

Some embodiments further include producing a production fluid from the organic-rich rock formation where the production fluid contains the hydrocarbon fluids and an aqueous fluid. The aqueous fluid may contain water-soluble minerals and/or migratory contaminant species. In such case, the production fluid may be separated into a hydrocarbon stream and an aqueous stream at a surface facility. Thereafter the water-soluble minerals and/or migratory contaminant species may be recovered from the aqueous stream. This embodiment may be combined with any of the other aspects of the invention discussed herein.

The produced hydrocarbon fluids may include a pyrolysis oil component (or condensable component) and a pyrolysis gas component (or non-condensable component). Condensable hydrocarbons produced from the formation will typically include paraffins, cycloalkanes, mono-aromatics, and di-aromatics as components. Such condensable hydrocarbons may also include other components such as tri-aromatics and other hydrocarbon species.

In certain embodiments, a majority of the hydrocarbons in the produced fluid may have a carbon number of less than approximately 25. Alternatively, less than about 15 weight % of the hydrocarbons in the fluid may have a carbon number greater than approximately 25. The non-condensable hydrocarbons may include, but are not limited to, hydrocarbons having carbon numbers less than 5.

In certain embodiments, the API gravity of the condensable hydrocarbons in the produced fluid may be approximately 20 or above (e.g., 25, 30, 40, 50, etc.). In certain embodiments, the hydrogen to carbon atomic ratio in produced fluid may be at least approximately 1.7 (e.g., 1.8, 1.9, etc.).

Some production procedures include in situ heating of an organic-rich rock formation that contains both formation hydrocarbons and formation water-soluble minerals prior to substantial removal of the formation water-soluble minerals from the organic-rich rock formation. In some embodiments of the invention there is no need to partially, substantially or completely remove the water-soluble minerals prior to in situ heating. For example, in an oil shale formation that contains naturally occurring nahcolite, the oil shale may be heated prior to substantial removal of the nahcolite by solution mining. Substantial removal of a water-soluble mineral may represent the degree of removal of a water-soluble mineral that occurs from any commercial solution mining operation as known in the art. Substantial removal of a water-soluble mineral may be approximated as removal of greater than 5 weight percent of the total amount of a particular water-soluble mineral present in the zone targeted for hydrocarbon fluid production in the organic-rich rock formation. In alternative embodiments, in situ heating of the organic-rich rock formation to pyrolyze formation hydrocarbons may be commenced prior to removal of greater than 3 weight percent, alternatively 7 weight percent, 10 weight percent or 13 weight percent of the formation water-soluble minerals from the organic-rich rock formation.

The impact of heating oil shale to produce oil and gas prior to producing nahcolite is to convert the nahcolite to a more recoverable form (soda ash), and provide permeability facilitating its subsequent recovery. Water-soluble mineral recovery may take place as soon as the retorted oil is produced, or it may be left for a period of years for later recovery. If desired, the soda ash can be readily converted back to nahcolite on the surface. The ease with which this conversion can be accomplished makes the two minerals effectively interchangeable.

In some production processes, heating the organic-rich rock formation includes generating soda ash by decomposition of nahcolite. The method may include processing an aqueous solution containing water-soluble minerals in a surface facility to remove a portion of the water-soluble minerals. The processing step may include removing the water-soluble minerals by precipitation caused by altering the temperature of the aqueous solution.

The water-soluble minerals may include sodium. The water-soluble minerals may also include nahcolite (sodium bicarbonate), soda ash (sodium carbonate), dawsonite (NaAl$(CO_3)(OH)_2$), or combinations thereof. The surface processing may further include converting the soda ash back to sodium bicarbonate (nahcolite) in the surface facility by reaction with $CO_2$. After partial or complete removal of the water-soluble minerals, the aqueous solution may be reinjected into a subsurface formation where it may be sequestered. The subsurface formation may be the same as or different from the original organic-rich rock formation.

In some production processes, heating of the organic-rich rock formation both pyrolyzes at least a portion of the formation hydrocarbons to create hydrocarbon fluids and makes available migratory contaminant species previously bound in the organic-rich rock formation. The migratory contaminant species may be formed through pyrolysis of the formation hydrocarbons, may be liberated from the formation itself upon heating, or may be made accessible through the creation of increased permeability upon heating of the formation. The migratory contaminant species may be soluble in water or other aqueous fluids present in or injected into the organic-rich rock formation.

Producing hydrocarbons from pyrolyzed oil shale will generally leave behind some migratory contaminant species which are at least partially water-soluble. Depending on the hydrological connectivity of the pyrolyzed shale oil to shallower zones, these components may eventually migrate into ground water in concentrations which are environmentally unacceptable. The types of potential migratory contaminant species depend on the nature of the oil shale pyrolysis and the composition of the oil shale being converted. If the pyrolysis is performed in the absence of oxygen or air, the contaminant species may include aromatic hydrocarbons (e.g. benzene, toluene, ethylbenzene, xylenes), polyaromatic hydrocarbons (e.g. anthracene, pyrene, naphthalene, chrysene), metal contaminants (e.g. As, Co, Pb, Mo, Ni, and Zn), and other species such as sulfates, ammonia, Al, K, Mg, chlorides, flourides and phenols. If oxygen or air is employed, contaminant species may also include ketones, alcohols, and cyanides. Further, the specific migratory contaminant species present may include any subset or combination of the above-described species.

It may be desirable for a field developer to assess the connectivity of the organic-rich rock formation to aquifers. This may be done to determine if, or to what extent, in situ pyrolysis of formation hydrocarbons in the organic-rich rock formation may create migratory species with the propensity to migrate into an aquifer. If the organic-rich rock formation is hydrologically connected to an aquifer, precautions may be taken to reduce or prevent species generated or liberated during pyrolysis from entering the aquifer. Alternatively, the organic-rich rock formation may be flushed with water or an aqueous fluid after pyrolysis as described herein to remove water-soluble minerals and/or migratory contaminant species. In other embodiments, the organic-rich rock formation may be substantially hydrologically unconnected to any source of ground water. In such a case, flushing the organic-rich rock formation may not be desirable for removal of migratory contaminant species but may nevertheless be desirable for recovery of water-soluble minerals.

Following production of hydrocarbons from an organic-rich formation, some migratory contaminant species may remain in the rock formation. In such case, it may be desirable to inject an aqueous fluid into the organic-rich rock formation and have the injected aqueous fluid dissolve at least a portion of the water-soluble minerals and/or the migratory contaminant species to form an aqueous solution. The aqueous solution may then be produced from the organic-rich rock formation through, for example, solution production wells. The aqueous fluid may be adjusted to increase the solubility of the migratory contaminant species and/or the water-soluble minerals. The adjustment may include the addition of an acid or base to adjust the pH of the solution. The resulting aqueous solution may then be produced from the organic-rich rock formation to the surface for processing.

After initial aqueous fluid production, it may further be desirable to flush the matured organic-rich rock zone and the unmatured organic-rich rock zone with an aqueous fluid. The aqueous fluid may be used to further dissolve water-soluble minerals and migratory contaminant species. The flushing may optionally be completed after a substantial portion of the hydrocarbon fluids have been produced from the matured organic-rich rock zone. In some embodiments, the flushing step may be delayed after the hydrocarbon fluid production step. The flushing may be delayed to allow heat generated from the heating step to migrate deeper into surrounding unmatured organic-rich rock zones to convert nahcolite within the surrounding unmatured organic-rich rock zones to soda ash. Alternatively, the flushing may be delayed to allow heat generated from the heating step to generate permeability within the surrounding unmatured organic-rich rock zones. Further, the flushing may be delayed based on current and/or forecast market prices of sodium bicarbonate, soda ash, or both as further discussed herein. This method may be combined with any of the other aspects of the invention as discussed herein Upon flushing of an aqueous solution, it may be desirable to process the aqueous solution in a surface facility to remove at least some of the migratory contaminant species. The migratory contaminant species may be removed through use of, for example, an adsorbent material, reverse osmosis, chemical oxidation, bio-oxidation, and/or ion exchange. Examples of these processes are individually known in the art. Exemplary adsorbent materials may include activated carbon, clay, or fuller's earth.

In certain areas with oil shale resources, additional oil shale resources or other hydrocarbon resources may exist at lower depths. Other hydrocarbon resources may include natural gas in low permeability formations (so-called "tight gas") or natural gas trapped in and adsorbed on coal (so called "coalbed methane"). In some embodiments with multiple shale oil resources it may be advantageous to develop deeper zones first and then sequentially shallower zones. In this way, wells will need not cross hot zones or zones of weakened rock. In other embodiments in may be advantageous to develop deeper zones by drilling wells through regions being utilized as pillars for shale oil development at a shallower depth.

Simultaneous development of shale oil resources and natural gas resources in the same area can synergistically utilize certain facility and logistic operations. For example, gas treating may be performed at a single plant. Likewise personnel may be shared among the developments.

Figure 15:
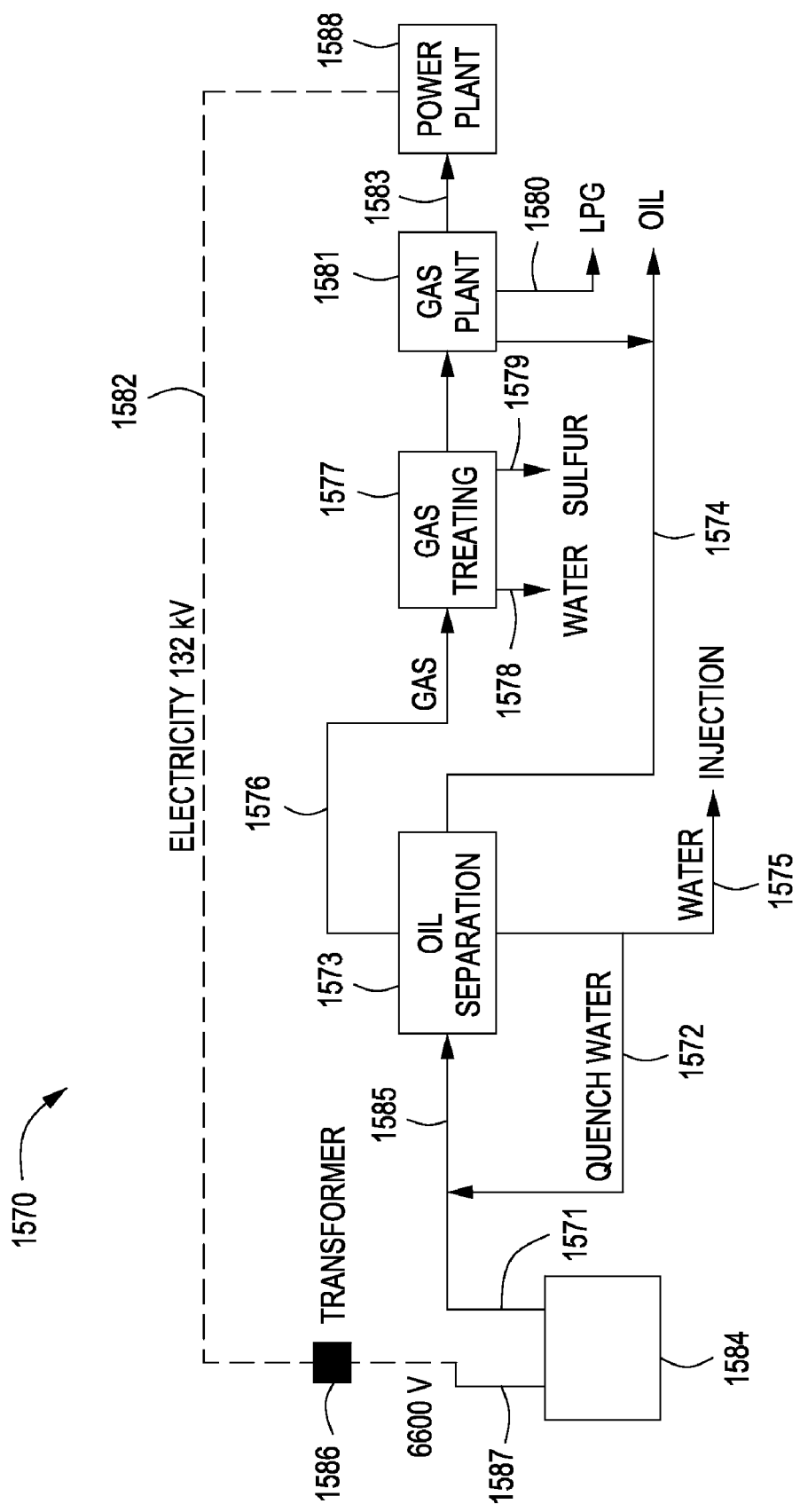
FIG. 15 is a process flow diagram of exemplary surface processing facilities for a subsurface formation development.

FIG. 15 illustrates a schematic diagram of an embodiment of surface facilities 1570 that may be configured to treat a produced fluid. The produced fluid 1585 may be produced from the subsurface formation 1584 though a production well 1571 as described herein. The produced fluid may include any of the produced fluids produced by any of the methods as described herein. The subsurface formation 1584 may be any subsurface formation, including, for example, an organic-rich rock formation containing any of oil shale, coal, or tar sands for example. A production scheme may involve quenching 1572 produced fluids to a temperature below 300° F., 200° F., or even 100° F., separating out condensable components (i.e., oil 1574 and water 1575) in an oil separator 1573, treating the noncondensable components 1576 (i.e. gas) in a gas treating unit 1577 to remove water 1578 and sulfur species 1579, removing the heavier components from the gas (e.g., propane and butanes) in a gas plant 1581 to form liquid petroleum gas (LPG) 1580 for sale, and generating electrical power 1582 in a power plant 1588 from the remaining gas 1583. The electrical power 1582 may be used as an energy source for heating the subsurface formation 1584 through any of the methods described herein. For example, the electrical power 1582 may be feed at a high voltage, for example 132 kV, to a transformer 86 and let down to a lower voltage, for example 6600 V, before being fed to an electrical resistance heater element located in a heater well 1587 located in the subsurface formation 1584. In this way all or a portion of the power required to heat the subsurface formation 1584 may be generated from the noncondensable portion of the produced fluids 1585. Excess gas, if available, may be exported for sale.

Produced fluids from in situ oil shale production contain a number of components which may be separated in surface facilities. The produced fluids typically contain water, non-condensable hydrocarbon alkane species (e.g., methane, ethane, propane, n-butane, isobutane), noncondensable hydrocarbon alkene species (e.g., ethene, propene), condensable hydrocarbon species composed of (alkanes, olefins, aromatics, and polyaromatics among others), $CO_2$, CO, $H_2$, $H_2S$, and $NH_3$.

In a surface facility, condensable components may be separated from non-condensable components by reducing temperature and/or increasing pressure. Temperature reduction may be accomplished using heat exchangers cooled by ambient air or available water. Alternatively, the hot produced fluids may be cooled via heat exchange with produced hydrocarbon fluids previously cooled. The pressure may be increased via centrifugal or reciprocating compressors. Alternatively, or in conjunction, a diffuser-expander apparatus may be used to condense out liquids from gaseous flows. Separations may involve several stages of cooling and/or pressure changes.

Water in addition to condensable hydrocarbons may be dropped out of the gas when reducing temperature or increasing pressure. Liquid water may be separated from condensed hydrocarbons via gravity settling vessels or centrifugal separators. Demulsifiers may be used to aid in water separation.

Methods to remove $CO_2$, as well as other so-called acid gases (such as $H_2S$), from produced hydrocarbon gas include the use of chemical reaction processes and of physical solvent processes. Chemical reaction processes typically involve contacting the gas stream with an aqueous amine solution at high pressure and/or low temperature. This causes the acid gas species to chemically react with the amines and go into solution. By raising the temperature and/or lowering the pressure, the chemical reaction can be reversed and a concentrated stream of acid gases can be recovered. An alternative chemical reaction process involves hot carbonate solutions, typically potassium carbonate. The hot carbonate solution is regenerated and the concentrated stream of acid gases is recovered by contacting the solution with steam. Physical solvent processes typically involve contacting the gas stream with a glycol at high pressure and/or low temperature. Like the amine processes, reducing the pressure or raising the temperature allows regeneration of the solvent and recovery of the acid gases. Certain amines or glycols may be more or less selective in the types of acid gas species removed. Sizing of any of these processes requires determining the amount of chemical to circulate, the rate of circulation, the energy input for regeneration, and the size and type of gas-chemical contacting equipment. Contacting equipment may include packed or multi-tray countercurrent towers. Optimal sizing for each of these aspects is highly dependent on the rate at which gas is being produced from the formation and the concentration of the acid gases in the gas stream.

Acid gas removal may also be effectuated through the use of distillation towers. Such towers may include an intermediate freezing section wherein frozen $CO_2$ and $H_2S$ particles are allowed to form. A mixture of frozen particles and liquids fall downward into a stripping section, where the lighter hydrocarbon gasses break out and rise within the tower. A rectification section may be provided at an upper end of the tower to further facilitate the cleaning of the overhead gas stream.

The hydrogen content of a gas stream may be adjusted by either removing all or a portion of the hydrogen or by removing all or a portion of the non-hydrogen species (e.g., $CO_2$, $CH_4$, etc.) Separations may be accomplished using cryogenic condensation, pressure-swing or temperature-swing adsorption, or selective diffusion membranes. If additional hydrogen is needed, hydrogen may be made by reforming methane via the classic water-shift reaction.

In producing hydrocarbons from a shale oil field, it may be desirable to control the migration of pyrolyzed fluids through the use of injection wells, particularly around the periphery of the field. Such wells may inject water, steam, $CO_2$, heated methane, or other fluids to drive cracked kerogen fluids towards production wells. In other arrangements, physical barriers may be placed around the area of the organic-rich rock formation under development. One example of a physical barrier involves the creation of freeze walls.

Freeze walls are formed by circulating refrigerant through peripheral wells to substantially reduce the temperature of the rock formation. In one aspect, ice is formed in pore spaces. This, in turn, prevents the migration of fluids across the freeze walls through any existing channels in the formation. Additionally, the freeze wall may prevent the pyrolyzation of kerogen present at the periphery of the field. The prevention of fluid migration is particularly important if the formation is connected to a ground water source.

The use of subsurface freezing to stabilize poorly consolidated soils or to provide a barrier to fluid flow is known in the art. Shell Exploration and Production Company has discussed the use of freeze walls for oil shale production in several patents, including U.S. Pat. No. 6,880,633 and U.S. Pat. No. 7,032,660. Shell's '660 patent uses subsurface freezing to protect against groundwater flow and groundwater contamination during in situ shale oil production.

Additional patents that disclose the use of so-called freeze walls are U.S. Pat. Nos. 3,528,252; 3,943,722; 3,729,965; 4,358,222; and 4,607,488. WO Pat. No. 98996480 is also of interest. Also, K. Stoss and J. Valk, "Uses and Limitations of Ground Freezing with Liquid Nitrogen", Engineering Geology, 13, pp. 485-494 (1979); and R. Rupprecht, "*Application of the Ground-Freezing Method to Penetrate a Sequence of Water-Bearing and Dry Formations—Three Construction Cases*", Engineering Geology, 13, pp. 541-546 (1979) discusses subsurface freezing techniques. The disclosures of these patents and the technical article are hereby incorporated by reference in their entireties.

The use of freeze wells to form a barrier around an in situ pyrolysis zone has also been described by Ljungstrom in U.S. Pat. No. 2,777,679. Vinegar, et al. more recently described a similar application of freeze walls. See, for example, U.S. Pat. No. 7,077,198; and U.S. Pat. No. 6,854,929.

Various means of using forming freeze walls have been previously disclosed. For example, U.S. Pat. No. 4,860,544, Kriet, et al., described a method for creating a closed, flow-impervious cryogenic barrier by extending an array of freeze wells at angles into the earth so that an inverted tent-like frozen structure is formed. Also, U.S. Pat. No. 3,267,680 described forming a freeze wall of increased mechanical strength by using a series of freeze wells that alternate in angle. Specifically every other well is vertical while the intermediate wells are 3-30° off-vertical.

Use of a single downhole expansion valve in a freeze well has been disclosed for certain specific applications, although not for forming a freeze wall. In U.S. Pat. No. 3,004,601 Bodine described using a cooling well with a downhole expansion valve specifically to reduce the temperature of subsurface oil. The purpose of reducing the temperature of the subsurface oil was to increase gas solubility and to prevent natural gas bubbles from hindering oil flow. Ralstin and Heathman in U.S. Pat. No. 3,559,737 described forming an underground gas storage chamber by sealing caprock fractures of a permeable formation using cryogenic cooling. Use of a downhole throttle is disclosed as a means of cooling.

Use of specific slurries as cooling fluids has been disclosed for application in methods to form freeze walls. For example, Schroeder in U.S. Pat. No. 3,372,550 described a method for designing a freeze well which can create an ice wall with greater strength at the bottom than at the top. The method requires injection of refrigerant into the well at multiple points. Schroeder disclosed the use of a carbon dioxide slurry as a cooling fluid. Also, In U.S. Pat. No. 3,271,962, Dahms, et al described a method of freezing the earth around a mine shaft using multiple freeze wells connected to a common subterranean cavity. Use of brines or partially frozen brine slurries as cooling fluids is disclosed.

The methods disclosed in the cited references generally use a working fluid (e.g., brine or liquid nitrogen) that is injected into various wells. The working fluid is circulated through the individual freeze wells in order to thermally chill the surrounding formation. Such wells oftentimes cause native water in the formation and adjacent the wells to freeze.

It is desirable to improve upon subsurface freezing methodologies to aid in the cooling of organic-rich rock within a subsurface formation. This is particularly true with respect to hydrocarbon development areas that require the pyrolyzation of an organic-rich rock formation. Such improvements are for the purpose of generating freeze zones deep underground. Alternatively, such improvements may be in the area of the cooling characteristics of the working fluid. Alternatively still, improvements may be in the area of increasing the subsurface freezing rate.

Figure 6:
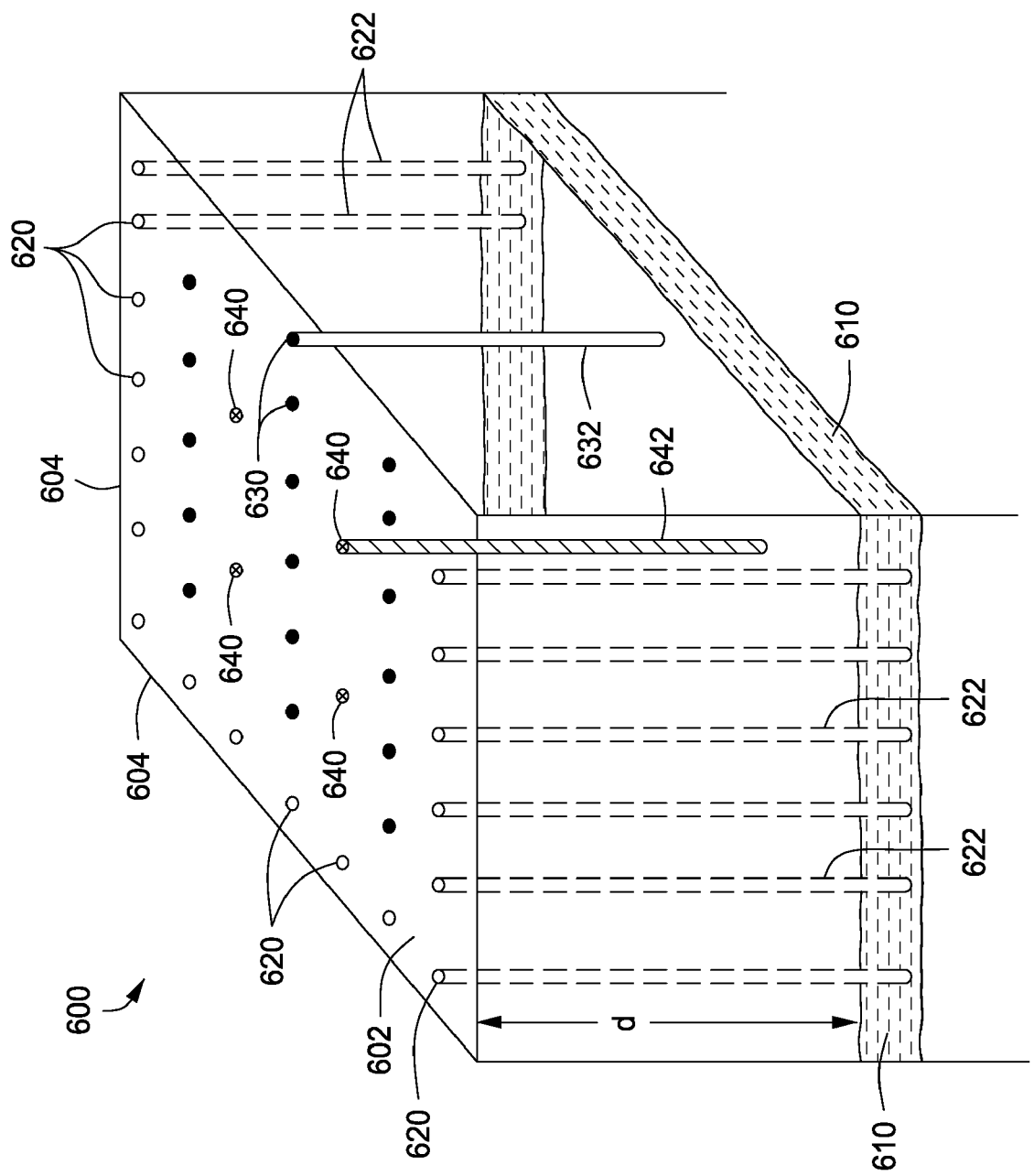
FIG. 6 is a cross-sectional view of a portion of a hydrocarbon development area. An illustrative organic-rich rock formation is shown beneath the surface. A plurality of freeze wells are positioned around peripheral portions of the hydrocarbon development area.

FIG. 6 is a cross-sectional view of a portion of a hydrocarbon development area 600. The development area 600 represents a surface 602, and a formation 610 below the surface 602. The subsurface formation 610 is an organic rich rock formation, such as oil shale. The oil shale formation 610 comprises kerogen which may be converted to hydrocarbon fluids. The development area 600 is for the purpose of developing hydrocarbons from the subsurface oil shale formation 610.

The formation 610 has a depth "d". The depth "d" is generally measured by the distance between the surface 602 and the top of the formation 610. In some embodiments, the oil shale formation 610 targeted for in situ pyrolysis or retorting is at a depth greater than 200 feet below the surface. In alternative embodiments, the oil shale formation 610 targeted for in situ retorting is at a depth greater than 500, 1,000, or 1,500 feet below the surface 602, but typically no deeper than 5,000 feet. In alternative embodiments, the oil shale formation 610 targeted for in situ retorting is at a depth between 500 and 4,000 feet; alternatively, between 600 and 3,500 feet; or between 700 and 3,000 feet below the surface 602.

The formation 610 may be an oil shale having a very limited permeability ab initio, e.g., less than 5 millidarcies. In order to develop the oil shale formation 610, it is necessary to pyrolyze the solid hydrocarbons, or kerogen, in the formation 610. This is done by heating the formation 610 above a pyrolysis temperature for an extended period of time. In order to heat the formation 610 and produce hydrocarbons, a plurality of heater wells 630 are provided. In the illustrative development area 600, the heater wells 630 are arranged in a plurality of rows, or linear arrays. Each heater well 630 has a wellbore 632 extending down to and completed in the formation 610. Each wellbore 632 in the arrangement of FIG. 6 is substantially vertical. However, the present inventions are not limited by the nature of the completion or the arrangements for the heater wells 630.

Preferably, the heater wells 630 are designed to provide resistive heat to the formation 610 at a selected temperature. In one aspect, the pyrolyzed oil shale formation 610 will have an average permeability of greater than 10 millidarcies after heating. The heater wells 630 may be located in relatively close proximity, being from 10 feet to up to 300 feet in separation. Alternatively, the wellbores may be spaced from 30 to 200 feet or from 50 to 100 feet.

Interspersed between the lines of heater wells 630 are production wells 640. Each production well 640 has a wellbore 642 extending down to and completed in the formation 610. Each production wellbore 642 in the arrangement of FIG. 6 is also substantially vertical. However, the present inventions are not limited by the nature of the completion or the arrangements for the production wells 640. Further, the relative arrangement of heater wells 630 to production wells 640 may be in polygonal patterns such as a 3-spot pattern or a 5-spot pattern (not shown).

The process of heating an oil shale formation 610 also changes the permeability of the formation 610. By heating the oil shale and transforming the kerogen to oil and gas, the permeability is increased through the gradual conversion of kerogen to fluids. Pyrolyzed hydrocarbon fluids migrate in the formation 610 to the wellbores 642 of the production wells 640.

It is desirable to contain the migration of pyrolyzed hydrocarbon fluids within the development area 600. Therefore, it is desirable to form a barrier to the flow of hydrocarbon fluids, such as a barrier along a periphery 604 of the shale oil development area 600. Such may be done through the completion of "freeze wells" along the periphery 604. In the development area 600 of FIG. 6, a plurality of freeze wells 620 are seen.

The freeze wells 620 are generally linear along transverse edges of the periphery 604. However, the present inventions are not limited to the placement or arrangement of the freeze wells 620. What is important is that the freeze wells 620 operate to prevent the flow of fluids from the development area 600 and across the periphery 604 or other designated boundary. Such fluids may be groundwater, pyrolyzed hydrocarbon fluids, or other fluids. This may be done by bringing the temperature of the formation 610 to a point where in situ fluids around the periphery 604 are frozen. At a minimum, this is done by maintaining a portion of the formation 610 at a temperature below the pyrolysis point, such as below 225° C. to keep the kerogen in a solid state. Thus, the term "freeze well" does not require that the well 620 actually create a frozen boundary, but only maintain a substantially solid boundary with very low permeability. Preferably though, the freeze wells 620 maintain the periphery 604 (or other barrier area) of the formation 610 below the freezing point of the in situ water, that is, approximately 0° C.

It is also noted from FIG. 6 that each freeze well 620 has a wellbore 622. The wellbores 622 are completed at or below the depth of the formation 610. In the arrangement shown in FIG. 6, each freeze well wellbore 622 is substantially vertical. However, the present inventions do not preclude the use of deviated, or even horizontally completed, wellbores 622.

Although not shown in FIG. 6, the freeze wells 620 operate together to form a freeze wall around the periphery 604 of the development area 600. The integrity of the freeze walls may be evaluated by placing monitoring wells outside of the freeze wall boundaries, or periphery 604. Fluid samples, particularly water samples, may be periodically collected and analyzed for unacceptable concentrations of various chemicals, e.g., metal species, acidic species, sulfur species, or hydrocarbons. Various downhole measurements may also be used instead of or complimentary to fluid sampling. Downhole measurements may include compositional measurements, pH measurements, temperature measurements, or electrical resistivity measurements.

FIG. 7 is a cross-sectional view of a wellbore 700 for a freeze well 620, in one embodiment. The wellbore 700 is completed at the level of an organic-rich rock formation 610. The illustrative wellbore 700 is substantially vertical. In order to form the wellbore 700, a bore is formed through the earth surface 602 and into the subterranean earth 702 using any known drilling procedure or technique. In order to isolate the bore from the surrounding subterranean earth 702, a string of casing 706 is hung or otherwise positioned adjacent the surrounding subterranean earth 702. The casing 706 is preferably cemented in place with a curable material such as cement 704. The casing 706 and cement 704 preferably are not perforated at any point, even adjacent the formation 610.

Next, an elongated tubular member 708 is hung or otherwise placed within the wellbore 700. The elongated tubular member 708 preferably extends from the earth surface 602 down to and through the subsurface formation 610. The elongated tubular member 708 defines a bore 705 which receives a cooling fluid. The cooling fluid serves as a working fluid for distributing cold energy to the subsurface formation 610. The term "cold energy" refers to the difference in enthalpy between the cooling fluid and the warmer surroundings to be cooled. The cooling fluid travels along the direction indicated by arrows 605.

The elongated tubular member 708 also defines an annular region 707 with the surrounding casing 706. Arrows 605 further indicate that the cooling fluid is circulated down the bore 705 of the tubular member 708 and then back up the annular region 707 to the earth surface 602. The cooling fluid is captured at a wellhead and optionally recirculated.

In one aspect, the cooling fluid may be chilled prior to injection into the wellbore 700. For example, a surface refrigeration system (not shown) may be used to chill the cooling fluid. In another aspect, the surface refrigeration system is replaced by a gas compression system (not shown) and a downhole expansion valve 720. Use of a downhole expansion valve 720 to cause cooling of the circulating fluid has the benefit of removing or significantly reducing "cold energy" losses to the overburden while transporting the cooling fluid from the surface 602 to the subsurface formation 610. Alternatively, use of a downhole expansion valve 720 removes the need for wellbore insulation in the overburden region.

Gas is compressed in the gas compression system at the surface 602. The compressed gas is then cooled to near-ambient temperature via air or water cooling. In some cases, the gas may be further cooled via refrigeration. None, some, or all of the fluid may be in a condensed state after the cooling steps. The cooling fluid is then sent down the bore 705 of the elongated tubular member 708, and through the expansion valve 720. This causes the fluid to cool via the Joule-Thomson effect.

Preferably, the expansion valve 720 is proximate to the subsurface formation 610. In the wellbore 700, the expansion valve 720 is at the top of the formation 610. The cooling fluid is allowed to absorb heat from the surrounding formation 610, which in turn leads to ice formation within the subsurface formation 610.

It is known that certain compressed gases when expanded through a valve undergo significant cooling. Use of a downhole expansion valve to generate the primary cooling effect has the benefit that a cold fluid does not need to flow from the surface 602 down to the depth of interest 610. Flowing a cooling fluid from the surface 602 would most likely result in a loss of cold energy due to conductive losses to the surrounding earth 702 during transit to the depth of interest. These losses can be quite significant if the target zone is deep. For example, in situ oil shale production target zones may be at a depth of 300 feet, 1,000 feet, 2,000 feet or more. Cold losses can be reduced through the use of insulation but this may increase well costs and reduce cross-sectional area available for fluid flow.

Insulation may be placed along all or a portion of the elongated tubular member 708 to reduce cross heat exchange between the upward and downward flows. Cross heat exchange reduces the length of the effective cooling zone since returning spent fluid warms the injected cooling fluid. If needed, insulation is preferably placed only below the expansion valve 720 since cross heat exchange can be beneficial above the valve 720 by allowing cool returning fluid to pre-cool the injected fluid prior to it passing through the expansion valve 720.

FIG. 8 is a cross-sectional view of the expansion valve 720. This is an enlarged view of the expansion valve 720 used in the wellbore 700 of FIG. 7. It can be seen that the expansion valve 720 has wall 728 with an upper threaded end 724 and a lower threaded end 726. The threaded ends 724, 726 enable the expansion valve 720 to be threaded in series with the elongated tubular member 708. The valve 720 defines a bore 725 which is in fluid communication with the bore 705 of the elongated tubular member 708.

The bore 725 of the valve 720 defines inner diameters. At the upper end 724 of the valve 720, an inner diameter 732 is provided which generally conforms to the inner diameter of the bore 705. However, the inner diameter 732 tapers to a smaller inner diameter 736 at the bottom 726 of the expansion valve 720. The effect is to create a constriction on the bore 705 of the elongated tubular member 708 in order to provide the Joule-Thompson effect.

FIG. 9 is a cross-sectional view of an alternate arrangement for an expansion valve 720' as might be used in the wellbore 700 of a freeze well 622. It can be seen that the expansion valve 720' also has wall 728' with an upper threaded end 724' and a lower threaded end 726'. The threaded ends 724', 726' again enable the expansion valve 720' to be threaded in series with the elongated tubular member 708. The valve 720' defines a bore 725' which is in fluid communication with the bore 705 of the elongated tubular member 708.

The bore 725' of the valve 720' defines inner diameters. At the upper 724 and lower 726' ends of the valve 720', an inner diameter 732', 736' is provided. Those inner diameters 732', 736' generally conform to the inner diameter of the bore 705. However, an intermediate constricted portion 722' of the valve 720' has a decreased inner diameter 737'. The effect is to create a constriction on the bore 705 of the elongated tubular member 708 in order to provide the Joule-Thompson effect.

It is noted that other arrangements of an expansion valve 720 may be employed for the methods and wellbores herein. The valves 720, 720' are merely illustrative.

Preferably, the cooling fluid is at a temperature of about −20° F. to −120° F. after passing through the expansion valve 720. More preferably, the cooling fluid is at a temperature of about −20° F. to −80° F. after passing through the expansion valve 720. More preferably still, the cooling fluid is at a temperature of about −30° F. to −60° F. after passing through the expansion valve 720.

Preferably, the cooling fluid is at a pressure of about 100 psia to 2,000 psia before passing through the expansion valve 720, and about 25 psia to about 500 psia after passing through the expansion valve 720. More preferably, the cooling fluid is at a pressure of about 200 psia to 800 psia before passing through the expansion valve 720, and about 40 psia to about 200 psia after passing through the expansion valve 720.

Figure 10:
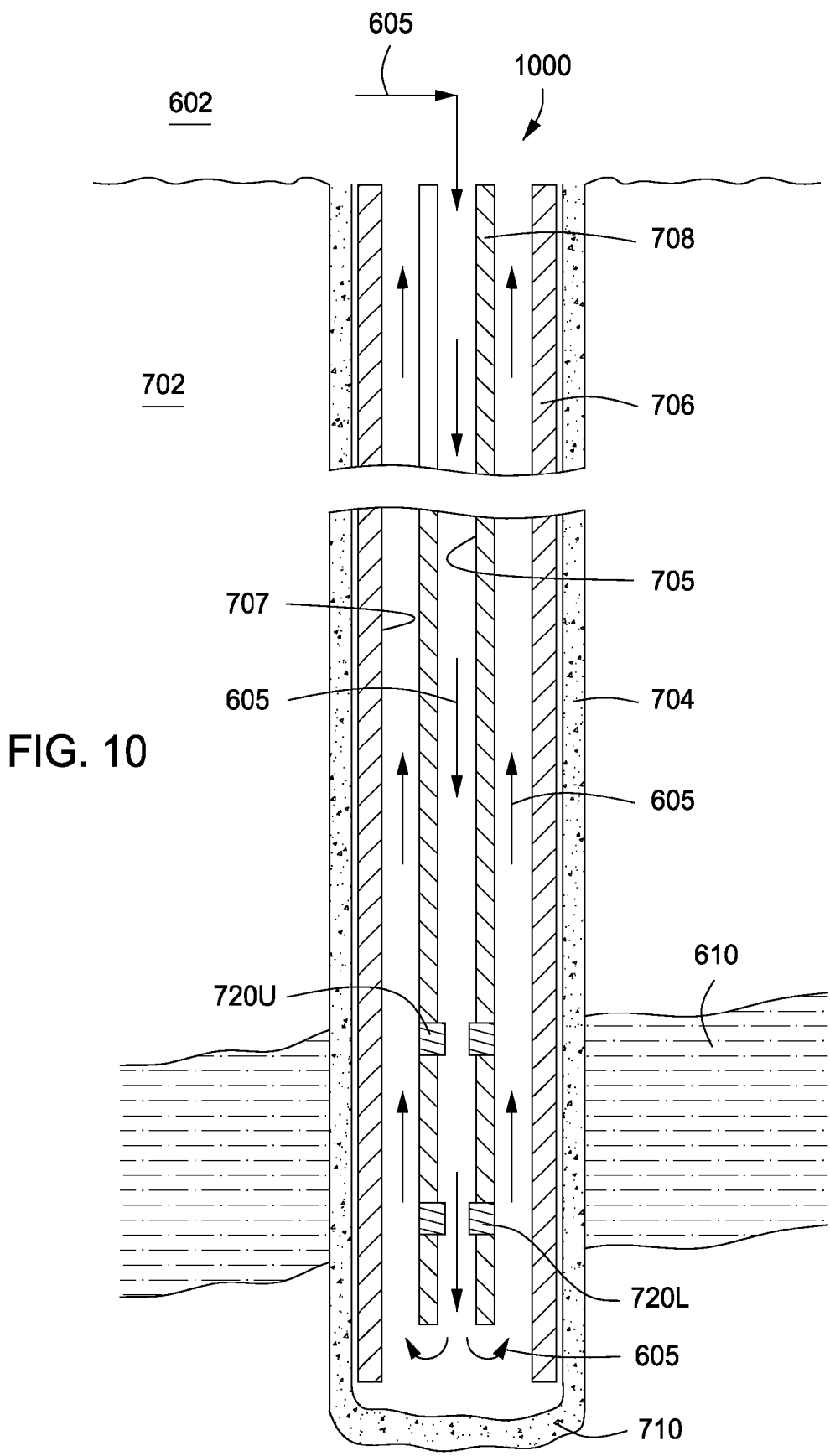
FIG. 10 is a cross-sectional view of a wellbore for a freeze well, in an alternate embodiment. In this wellbore, two expansion valves are placed proximate the level of an organic-rich rock formation. The expansion valves used are as depicted in FIG. 9.

As noted, the expansion valve 720 may be placed in the wellbore of a freeze well 620 at different locations. In addition, more than one expansion valve 720 may be used. FIG. 10 is a cross-sectional view of a wellbore 1000 for a freeze well 620, in an alternate embodiment. In this wellbore 1000, two expansion valves 720U and 720L are placed at the level of an organic-rich rock formation 610. Expansion valve 720U is placed proximate the top of the formation 610, while expansion valve 720L is placed proximate the bottom of the formation 610. Thus, expansion valve 720U is an upper valve, while expansion valve 720L is a lower valve.

The use of two expansion valves 720U and 720L permits a more uniform cooling temperature across the formation 610 than possible with a single expansion valve. This in turn can lead to a more uniform freeze wall across the thickness of the formation 610 and, thus, reduce the energy needed to reach a desired thickness throughout.

In operation, a first temperature drop is accomplished as the working fluid moves through the first expansion valve 720U. The working fluid then imparts cold energy to the subsurface formation 610 on the way down. A second temperature drop is then accomplished as the working fluid moves through the second expansion valve 720L. The working fluid may then impart additional cold energy to the subsurface formation 610 on the way up.

It is noted that the relative placement of valves 720U and 720L is a matter of designer's choice. In addition, the sizing of the inner diameters of the expansion valves 720U, 720L is a matter of designer's choice. The placement and the sizing of the expansion valves 720U, 720L may be adjusted to provide for selective pressure drops. In one aspect, the cooling fluid is at a pressure of about 500 psia to 2,000 psia before passing through the second expansion valve 720L, and about 25 psia to about 500 psia after passing through the second expansion valve 720L.

For the case of a single downhole expansion valve, the cooling fluid is preferably at a pressure of about 100 psia to 2,000 psia before passing through the expansion valve 720. More preferably, the cooling fluid is at a pressure of about 200 psia to 800 psia. For the case of dual downhole expansion valves such as 720U and 720L, preferably the cooling fluid is at a pressure of about 800 psia to 4,000 psia before passing through the first expansion valve 720U, about 100 psia to about 800 psia after passing through the first expansion valve 720U, and about 25 to 100 psia after passing through the second expansion valve 720L. More preferably, the cooling fluid is at a pressure of about 800 psia to 2,000 psia before passing through the first expansion valve 720U, about 100 psia to about 500 psia after passing through the first expansion valve 720U, and about 25 psia to about 100 psia after passing through the second expansion valve 720L.

In one aspect, a ratio of entry pressure-to-exit pressure across the expansion valves is provided. For instance, the ratio of entry pressure-to-exit pressure across the first expansion valve and the ratio of entry pressure-to-exit pressure across the second expansion value are equal to within a factor of about three.

In the wellbore 1000 of FIG. 10, both expansion valves 720U and 720L create a Joule-Thompson effect for the cooling fluid within the bore 705 of the elongated tubular member 708. However, it is feasible to provide one or both of the pressure drops outside of the bore 705. This is demonstrated in FIG. 11.

Figure 11:
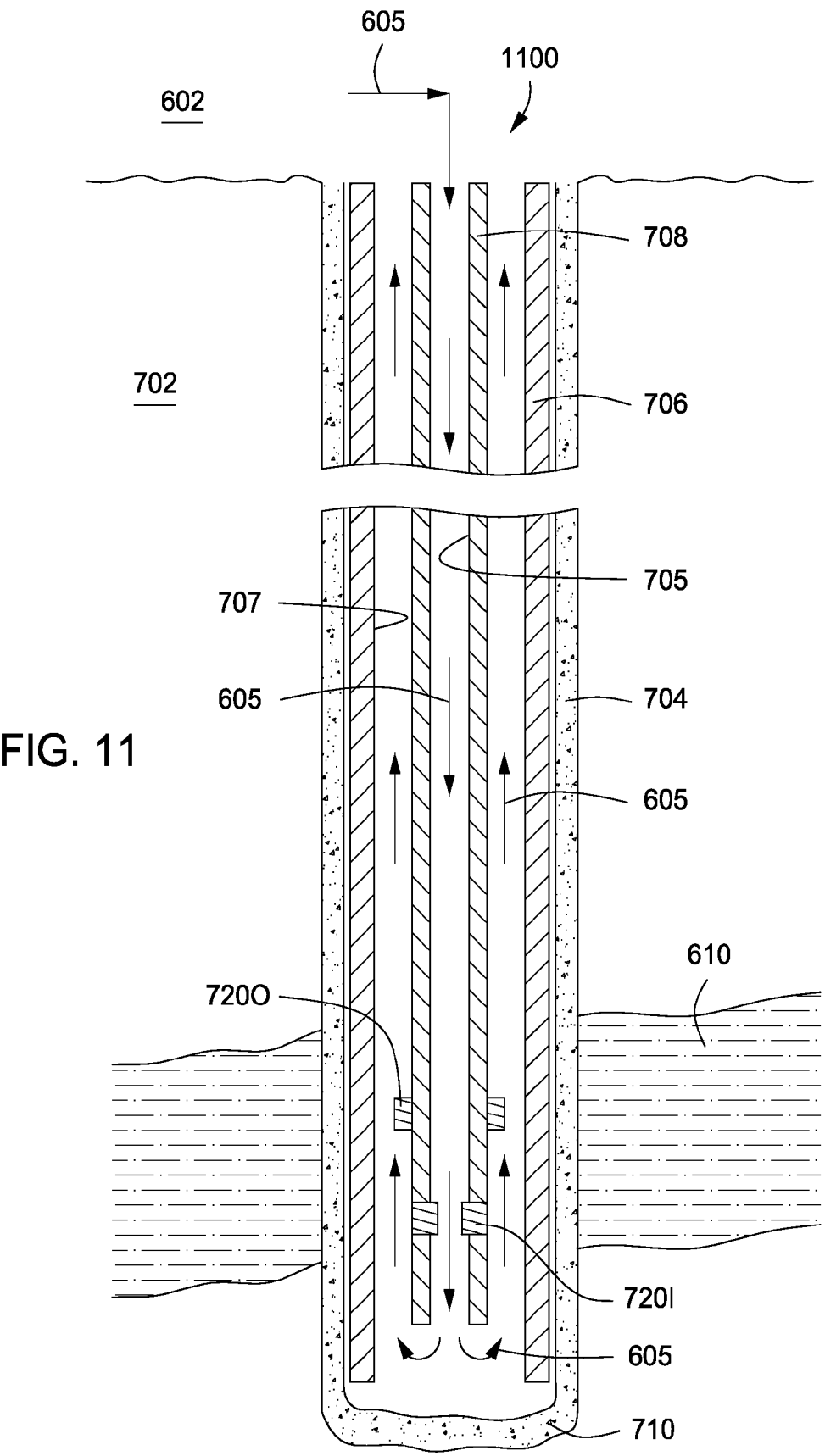
FIG. 11 is a cross-sectional view of a wellbore for a freeze well in yet an additional embodiment. Again, two expansion valves are placed proximate the level of an organic-rich rock formation. One valve is along the inner diameter of an elongated tubular member, while the other is along the outer diameter of the elongated tubular member.

FIG. 11 is a cross-sectional view of a wellbore 1100 for a freeze well 620 in yet an additional embodiment. In this arrangement 1100, two expansion valves 7201 and 7200 are again placed proximate the level of the organic-rich rock formation 610. However, one valve 7201 is along the inner diameter (or bore 705) of the elongated tubular member 708, while the other valve 7200 is along the outer diameter (or annular region 707) of the tubular member 708.

The first or inner expansion valve 7201 creates a pressure drop within the bore 705, and may be in the form of valves 720 or 720'. However, the second or outer expansion valve 7200 creates a pressure drop outside of the bore 705. This may be in the form of a clamped circular device or a tubular member with an enlarged outer diameter.

In the wellbore arrangements 700, 1000 and 1100, the cooling fluid is pumped under pressure down the bore 705, to the bottom 710 of the wellbore, and then back up the annular region 707. The cooling fluid is then recaptured at the surface 602. As noted, the cooling fluid may be rechilled in a refrigeration system and then again pumped through the gas compression system. In these embodiments, it is optional to provide insulation to the elongated tubular member 708 above the targeted subsurface formation 610.

Figure 12:
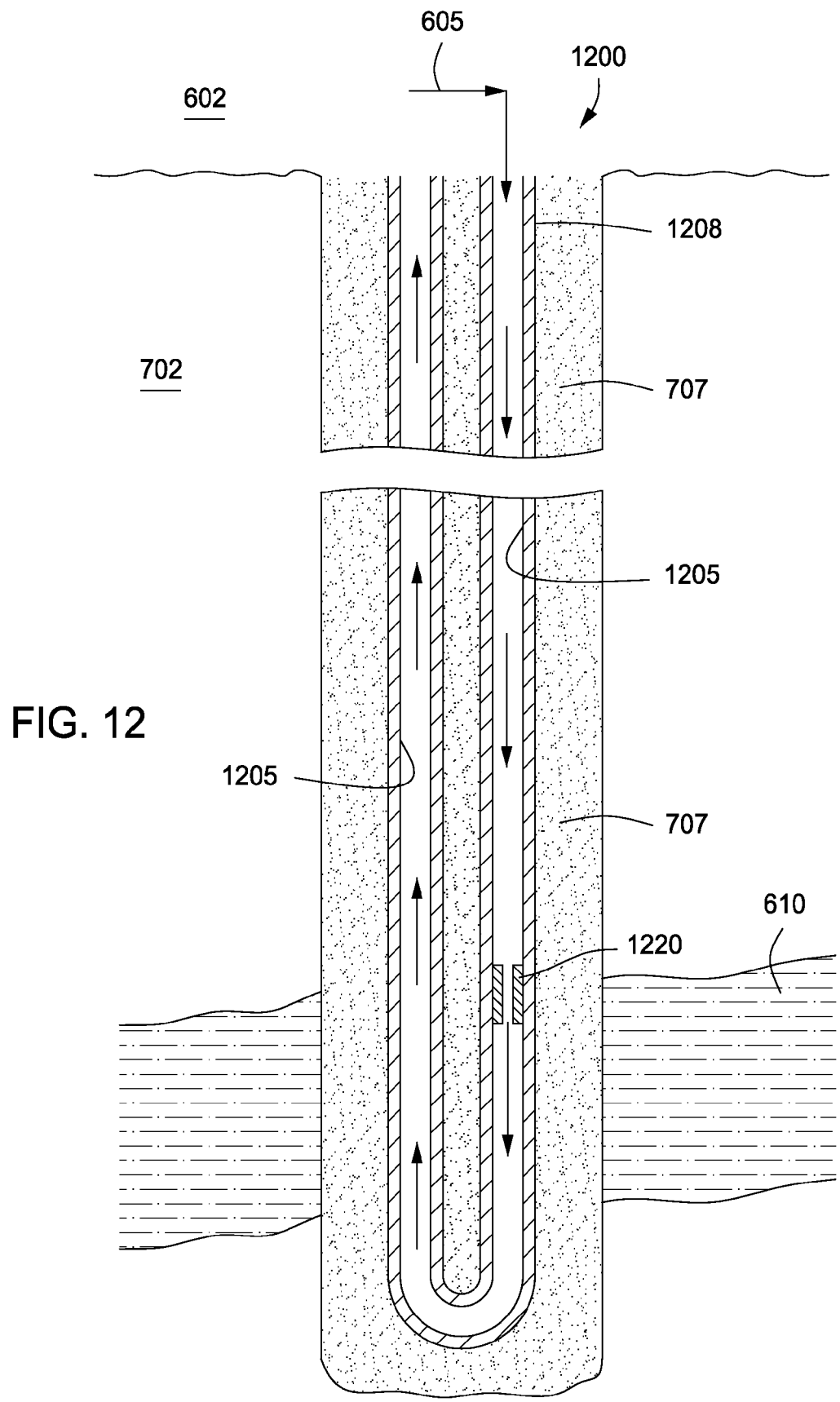
FIG. 12 is a cross-sectional view of a wellbore for a freeze well in yet an additional embodiment. Here, the elongated tubular member is a U-tube for circulating the cooling fluid back up to the surface. An expansion valve is placed along the inner diameter of the U-tube.

In an alternate wellbore arrangement, a U-tube may be used as the elongated tubular member. FIG. 12 presents a cross-sectional view of a wellbore 1200 for a freeze well 620, in an alternate embodiment. The wellbore 1200 is generally in accord with wellbore 700 of FIG. 7. However, in this arrangement the elongated tubular member is a U-tube 1208. The U-tube 1208 provides a closed system through which the cooling fluid flows. The cooling fluid flows into a bore 1205 in the U-tube 1208 in accordance with arrows 605. The cooling fluid remains in the bore 1205 flowing both downward to the subsurface formation 610 and back up to the surface 602.

An expansion valve 1220 is once again employed in the wellbore 1200. The expansion valve 1220 may use one of the configurations of FIG. 8 or 9, or any other embodiment that will provide a Joule-Thompson effect. The expansion valve 1220 is preferably placed at the top of the formation 610 so that the cooling fluid flows through the valve 1220 prior to or just at the point of reaching the subsurface formation 610. However, the embodiment of FIG. 12 is not limited to the exact placement of the expansion valve 1220. For instance, the expansion valve 1220 may be positioned in the U-tube 1208 at a point in which the cooling fluid is traveling back up to the surface 602.

It is also noted that in the wellbore 1200 of FIG. 12, no casing or cement are used to isolate the earth 702. Instead, packing, such as sand or gravel are placed in the annular region 707 between the U-tube 1208 and the formation 610. The sand aids conductive heat transfer.

In any of the wellbore arrangements 700, 1000, 1100, 1200, the return cooling fluid may still be relatively cold, at least compared to ambient conditions. This fluid could be used in connection with a refrigeration system at the surface 602. Refrigeration of working facilities could be provided so that the cold energy remaining in the return fluid is not lost. However, it is preferred that the fluid returning to the surface be near ambient temperature so as to maximize its loss of cold energy to the formation 610 itself.

When using downhole expansion valves, a number of fluids are suitable for the freeze wells 620. Preferably, the fluid returns largely in its vapor state. This reduces head losses in the return conduit and, thus, increases the achievable pressure differential across the expansion valve 720. It is additionally preferable that any vaporizable liquids generated through the expansion valve 720 be largely vaporized in the subsurface formation 610. The latent heat of vaporization of these liquids may constitute a large portion of the available cold energy to transfer into the formation 610.

It is also preferable that the temperature of the expanded fluid immediately exiting the valve 720 be below about 0° F., and more preferably, be below about −30° F. This provides a sizeable temperature differential to drive heat transfer and to provide a sizeable thermal capacity to absorb heat from the surrounding formation 610 into the cooling fluid. Suitable fluids may include $C_2$-$C_4$ hydrocarbons (e.g., ethane, ethylene, propane, propylene, isobutane, and n-butane) or mixtures containing a majority of one or more of these components. Other suitable components may include refrigerant halogenated hydrocarbons, carbon dioxide, and ammonia.

The specific compositional choice for a cooling fluid depends on a number of factors including working pressures, available pressure drop through the valve, thermodynamic behavior of the fluid, temperature limits of the metallurgy of the conduits, safety considerations, and cost/availability considerations.

In another embodiment, all of the refrigeration is done in a surface facility, with the working fluid being a slurry consisting of a partially frozen liquid. One method of generating a cold slurry is to use a continually scraped heat exchanger to cool and partially freeze the fluid. The cold slurry is circulated through the freeze wells 620 to chill the subsurface formation 610. Use of a partially frozen liquid as a heat transfer medium can be beneficial since the latent heat of melting adds significantly to the cooling capacity of the fluid on a volume basis. To be most effective, the freezing point of the liquid should be below the freezing point of water. Preferably, the freezing point is below about 0° F., and more preferably be below about −30° F. This provides a sizeable temperature differential to drive heat transfer and to provide a sizeable thermal capacity to absorb heat from the surrounding formation 610 into the cooling fluid. Suitable liquids may include partial frozen salt-water mixtures (brines), alcohols, alcohol-water mixtures, or glycol-water mixtures.

Suitable brines may include inorganic salts such as sodium chloride, calcium chloride, or lithium chloride. The brines may also include salts of certain organic acids such as potassium formate, potassium acetate, potassium citrate, ammonium formate, ammonium acetate, ammonium citrate, sodium citrate, sodium formate, or sodium acetate. Applicable alcohols may include methanol, ethanol, and isopropanol. Applicable glycols include monoethylene glycol, diethylene glycol, and propylene glycol.

Preferably, the working fluid is of low viscosity and of low corrosivity to the conduits. In certain cases, eutectic mixtures (i.e., minimum freezing point compositions) may be particularly appealing to provide low temperatures. For example, pure methanol freezes at −98° F., but a binary mixture of 83 wt % methanol and 17 wt % water freezes at −129° F. In other cases slurries with freezing points between −20° F. and −40° F. may be appealing so to permit safe use of standard carbon steel (which becomes brittle at lower temperatures) while still maintaining significant cooling capacity. Such fluids may include brines, water-alcohol mixtures, or water-glycol mixtures. For example a 50-50 wt % water-ethanol mixture has a freezing point of −38° F. and a density where ice is nearly neutrally buoyant. Neutrally buoyant ice may aid flowability of the slurry.

Alternative working fluids may include light liquid hydrocarbon species (e.g., $C_7$-$C_{14}$) and mixtures, including commonly available mixtures such as gasoline and diesel. These hydrocarbon fluids can freeze out waxes at subzero temperatures and thus form partially frozen slurries. The hydrocarbon fluid composition, particularly n-paraffin content, can be varied to tailor its freezing behavior over a wide range of temperatures.

It can be seen that various embodiments of a wellbore for a freeze well have been disclosed. The cooling wellbore is for the purpose of lowering the temperature of a subsurface formation 610. The wellbore is completed at or below a depth of the subsurface formation 610, and in one aspect includes an elongated tubular member such as tubular member 708, and a first expansion valve such as valve 720. The first expansion valve is in fluid communication with the elongated tubular member. A cooling fluid is directed through the elongated tubular member and the first expansion valve in order to cool the subsurface formation 610.

In one aspect, the elongated tubular member is a U-tube such as tubular member 1208. The first expansion valve may be positioned in the tubular member at or above a depth of the subsurface formation 610. Alternatively, the first expansion valve may be positioned in the tubular member proximate a lower depth of the subsurface formation. Alternatively, the first expansion valve may be positioned in the tubular member proximate an upper depth of the subsurface formation.

In one embodiment, the wellbore further comprises an annular region formed between the elongated tubular member and a diameter of the wellbore. The cooling fluid may be circulated through the tubular member, to the subsurface formation, and back up the wellbore through the annular region.

Various cooling fluids may be used. In one aspect, the cooling fluid comprises a gas and remains in a substantially gaseous state when passed through the first expansion valve. Alternatively, the cooling fluid may be injected in a gaseous state, but a portion of the cooling fluid condenses from a gas to a liquid state as the cooling fluid is passed through the first expansion valve.

The injected cooling fluid may comprise at least of 50 mol. percent of propane, propylene, ethane, ethylene, or a mixture thereof. Alternatively, the cooling fluid may comprise at least of 80 mol. percent of propane, propylene, ethane, ethylene, isobutane, or a mixture thereof. Alternatively, the injected cooling fluid may comprise at least of 50 mol. percent of a halogenated hydrocarbon. Alternatively still, the cooling fluid may comprise at least of 80 mol. percent of a halogenated hydrocarbon.

The cooling fluid may be chilled prior to injection into the tubular member. For instance, the cooling fluid may be chilled below ambient air temperature prior to injection into the tubular member. In any instance, the cooling fluid may be injected into the subsurface formation at a controlled rate such that the cooling fluid flows through the first expansion valve and adjacent the subsurface formation, and then leaves the subsurface formation with no more than 20 wt. % in a liquid state. Alternatively, the cooling fluid may be injected into the subsurface formation at a controlled rate such that the cooling fluid flows through the first expansion valve and adjacent the subsurface formation, and then leaves the subsurface formation with no more than 5 wt. % in a liquid state.

In one aspect, the cooling fluid is a partially frozen salt-water mixture. The salt in the salt-water mixture may be, for example, NaCl or $CaCl_2$. The cooling fluid may alternately define a partially frozen alcohol-water mixture. The alcohol may be, for example, methanol or ethanol. In another aspect, the cooling fluid may define a partially frozen glycol-water mixture. The glycol may be, for example, MEG, DEG, or propylene glycol. In another aspect, the cooling fluid may define a hydrocarbon mixture comprised of greater than 50 mol. percent carbon molecules of $C_7$, $C_8$, $C_9$, $C_{10}$, $C_{11}$, $C_{12}$, $C_{13}$, $C_{14}$, or mixtures thereof.

The cooling wellbore may be placed at various positions relative to the shale oil development area. Preferably, one or more wellbores are formed outside of or along the periphery of the area under shale oil development.

In view of the various wellbore arrangements discussed above, various corresponding methods for lowering the temperature of a portion of a subsurface formation 610 may be provided. In practicing such methods, a wellbore is completed at or below a depth of the subsurface formation 610. The wellbore (such as wellbore 700 or 1200, for example) has an elongated tubular member (such as tubular member 708 or 1208, for example) for receiving a cooling fluid and for transporting it downhole to the subsurface formation 610. The wellbore also has a first expansion valve (such as valve 720 or 720', for example) in fluid communication with the tubular member through which the cooling fluid flows. The method then includes the steps of injecting the cooling fluid under pressure into the wellbore, and expanding the cooling fluid across the first expansion valve. In this way, the temperature of the cooling fluid is reduced. The temperature of the surrounding formation 610 is then likewise reduced through thermal convection, or the transfer of "cold energy."

It is preferred that the subsurface formation is an oil shale formation. The oil shale formation is part of a development area for converting kerogen to shale oil, or hydrocarbons. The wellbore may be placed at various positions relative to the shale oil development area. Preferably, one or more wellbores are formed outside of or along the periphery of the area under shale oil development. An example of such a development area has been shown and described at 600 in FIG. 6.

In one aspect, the elongated tubular member is a U-tube, such as U-tube 1208. In this instance, the method further includes the step of circulating the fluid into the U-tube, down to the subsurface formation 610, and back up to the surface 602. The first expansion valve (such as valve 1220) may be positioned in the wellbore such that the cooling fluid flows through the first expansion valve upon or before reaching the depth of the subsurface formation 610. The first expansion valve may be positioned along the tubular member proximate an upper depth of the subsurface formation, or elsewhere along the formation. For instance, the first expansion valve may be positioned along the tubular member at a depth of about 300 to 600 feet below the surface. Alternatively, the first expansion valve may be positioned so that the cooling fluid flows through the first expansion valve en route back up to the surface 602.

In one embodiment, the wellbore further comprises an annular region (such as region 707) formed between the elongated tubular member and a diameter of the wellbore. In this instance, the method may further include the step of circulating the fluid through the tubular member, to the completion depth, and back up the wellbore through the annular region. The cooling fluid may flow through the first expansion valve upon or before reaching the depth of the subsurface formation. For instance, the first expansion valve may be positioned along the tubular member proximate an upper depth of the subsurface formation.

In another embodiment, the elongated tubular member is a U-tube comprising a downward portion through which the cooling fluid flows to the subsurface formation, and an upward portion through which the cooling fluid flows back to the surface. Preferably, the downward portion is insulated above the subsurface formation. In this embodiment, the wellbore may further include a second expansion valve. The second expansion valve is in fluid communication with the tubular member. A first pressure drop takes place through the first expansion valve, and a second pressure drop takes place through the second expansion valve. In this instance, the method further comprises expanding the cooling fluid across the second expansion valve, thereby reducing the temperature of the cooling fluid. In this way, the cooling fluid flows through the second expansion valve to further cool the subsurface formation.

In one aspect, the elongated tubular member is a U-tube. The cooling fluid flows through the first expansion valve upon or before reaching the depth of the subsurface formation. The cooling fluid further flows through the second expansion valve at or after reaching the depth of the subsurface formation.

Preferably, the subsurface formation holds in situ water. Further, the cooling fluid cools the subsurface formation to a sufficient extent to freeze at least a portion of the in situ water. In one aspect, the method further includes the step of injecting low salinity water into at least a portion of the subsurface formation to reduce the natural salinity of the in situ water and to raise the freezing temperature of the in situ water.

Another method for lowering the temperature of a subsurface formation is provided herein. Generally, the method comprises the step of injecting a cooling fluid at a first temperature into a wellbore. Here, the wellbore is completed at or below a depth of the subsurface formation. The temperature of the cooling fluid is then lowered after it has entered the wellbore. The cooling fluid is then passed at the lower temperature through the wellbore at a depth of the subsurface formation. Finally, the cooling fluid is circulated back to the surface.

The wellbore may comprise an elongated tubular member that receives the cooling fluid en route to the subsurface formation. The wellbore may further comprise an expansion valve in fluid communication with the tubular member through which the cooling fluid flows to cool the cooling fluid to the lower temperature.

Another method for lowering the temperature of a subsurface formation is provided herein. This method includes the step of injecting a cooling fluid under pressure into a wellbore. The cooling fluid comprises a slurry having particles of frozen material. Use of a slurry can have the benefit of significantly increasing the "cold energy" carried by the cooling fluid per mass of fluid. Moreover, a slurry can maintain a relatively constant temperature even as it loses "cold energy" due to the latent heat of fusion of the solids. The wellbore is completed at or below a depth of the subsurface formation. The wellbore has a bore formed through the subsurface formation that defines a diameter. In this case no downhole expansion valve is required. Use of a slurry can have the extra benefit or removing or reducing the need for insulation between the upward and downward flows since the slurry can be maintained at a relatively constant temperature as long as frozen solids are still present.

In one aspect of this additional embodiment, the wellbore includes an elongated tubular member such as tubular member 708. The tubular member receives the cooling fluid en route to the subsurface formation 610. The elongated tubular member may be a U-tube such as tubular member 1208. In this instance, the method further includes circulating the cooling fluid into the U-tube, to the completion depth, and back to the surface 602.

The wellbore may further comprise an annular region (such as annular region 707) formed between the elongated tubular member and the diameter of the wellbore. In this instance, the method may further include circulating the fluid into the tubular member, down to the completion depth, and back up the wellbore through the annular region.

In another aspect of this additional embodiment, the wellbore may further comprise an expansion valve. The expansion valve is in fluid communication with the tubular member through which the cooling fluid flows to cool the subsurface formation. The expansion valve may be positioned along the tubular member proximate an upper depth of the subsurface formation. Alternatively, the expansion valve may be positioned intermediate the subsurface formation.

Various cooling fluids may be used. In one aspect, the cooling fluid is a partially frozen salt-water mixture. The salt in the salt-water mixture may be, for example, NaCl or $CaCl_2$. The cooling fluid may alternately define a partially frozen alcohol-water mixture. The alcohol may be, for example, methanol or ethanol.

In another aspect, the cooling fluid may define a partially frozen glycol-water mixture. The glycol may be, for example, MEG, DEG, or propylene glycol. In another aspect, the cooling fluid may define a hydrocarbon mixture comprised of greater than 50 mol. percent carbon molecules of $C_7$, $C_8$, $C_9$, $C_{10}$, $C_{11}$, $C_{12}$, $C_{13}$, $C_{14}$, or mixtures thereof.

The particles of frozen material used in this additional embodiment may be less than 50 microns in size. Some or all of the particles may be less than 10 microns in size.

Preferably, the subsurface formation holds in situ water. Further, the cooling fluid cools the subsurface formation to a sufficient extent to freeze at least a portion of the in situ water. In one aspect, the method further includes the step of injecting low salinity water into at least a portion of the subsurface formation to reduce the natural salinity of the in situ water and to raise the freezing temperature of the in situ water.

Another method for lowering the temperature of a subsurface formation is also provided herein. The method includes the step of completing a first injection well, and completing a second injection well adjacent the first injection well. A fracturing fluid is injected into the first injection well so as to form a fracture at a depth of the subsurface formation, thereby providing fluid communication between the first and second injection wells. The fracturing fluid preferably comprises a proppant to prop the formation. Once fluid communication is established, a cooling fluid is injected under pressure into the first injection well. The cooling fluid is further injected into the fracture so as to lower the temperature of the subsurface formation.

Figure 13:
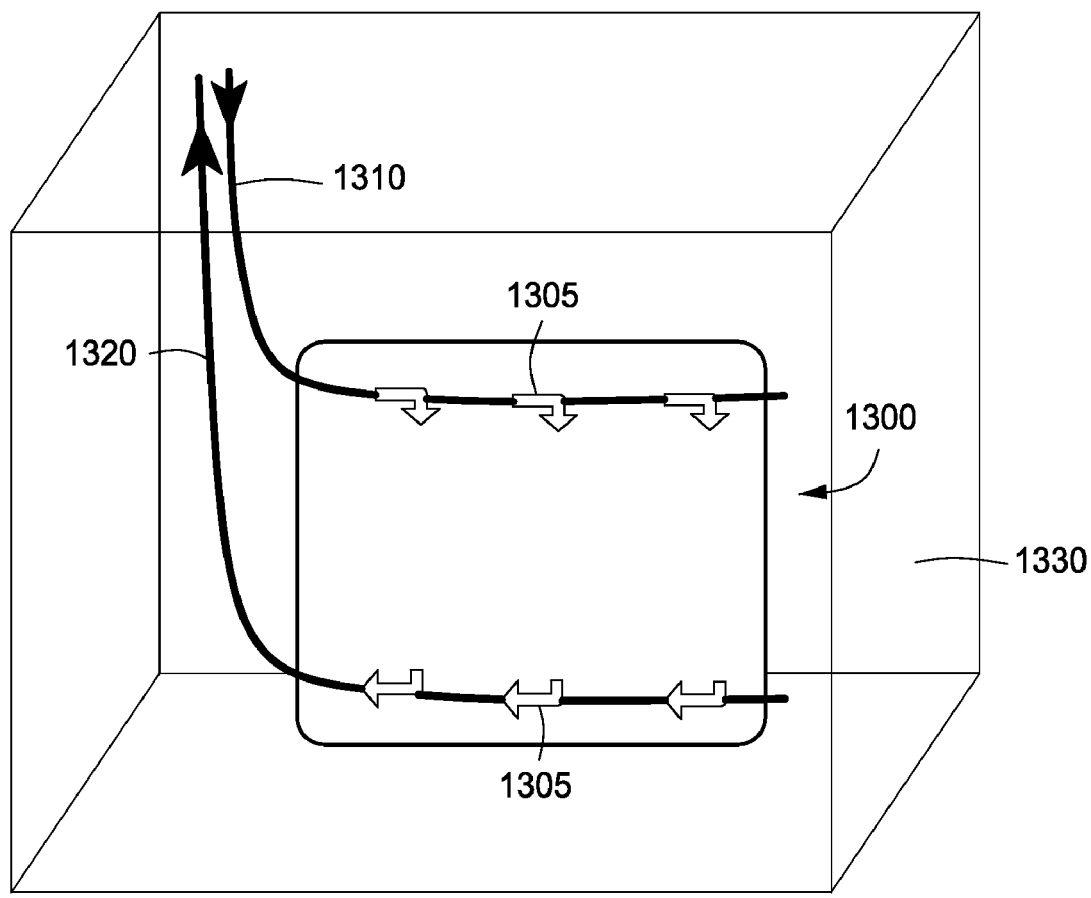
FIG. 13 is a perspective view of a freeze wall being formed in a subsurface formation. A cooling fluid is being circulated between two wells, one of which is injecting the cooling fluid and the other of which is receiving the cooling fluid via a fracture in the formation.

FIG. 13 is a perspective view of a freeze wall 1300 being formed in a subsurface formation 1330 in accordance with this additional method. A first injection well 1310 is completed in the formation 1330. Preferably, this first injection well 1310 is completed horizontally. Likewise, a second injection well 1320 is completed adjacent the first injection well 1310. Preferably, the second injection well 1320 is also completed horizontally.

The first injection well 1310 and the second injection well 1320 have each been perforated. Further, at least one of the injection wells 1310 of 1320 has been fractured. In this way, fluid communication is established between the first 1310 and second 1320 injection wells in the formation 1330.

In order to form the freeze wall 1300, a cooling fluid is being circulated between the first 1310 and second 1320 injection wells. Arrow 1305 indicates a direction of flow of a cooling fluid, in one embodiment. It can be seen in this arrangement that the cooling fluid is being injected into the first injection well 1310, through the formation 1330, and into the second injection well 1320. The second injection well 1320 receives the cooling fluid via fractures formed in the formation 1330. As a result of the circulation of cooling fluid through the formation 1330, the temperature of the formation 1330 is lowered. In one aspect, the temperature is lowered below the freezing point of water in situ.

It is understood that the well arrangement in FIG. 13 is merely illustrative. In practice, a number of injection wells 1310, 1320 will be completed in the formation 1330. The wells 1310, 1320 may be completed either vertically or in a deviated manner.

For single phase cooling fluids, the fracturing fluid preferably comprises a proppant to prop the formation. For slurry cooling fluids, the fracturing fluid preferably does not contain a proppant or contains proppant particles which are at least eight times that of the average size of the slurry particles.

The benefit of flowing a cooling fluid through a fracture is that the formation of an impermeable frozen zone can be accelerated. For equal temperature conditions, heat transfer from a planar source (i.e., a fracture) is more rapid than from a radial source (i.e., a wellbore) due to the greater contact area of a planar source. Moreover, the cooling front propagating from a planar source travels faster than from a radial source since it does not spread out and disperse nearly as much. Additionally, use of planar fractures can significantly reduce the number of wells required to generate a freeze wall as compared to one formed by a row of unfractured freeze wells.

In one embodiment, at least a portion of the cooling fluid is circulated back up to the surface through the second injection well. In this method, the geomechanical conditions are chosen such that the fracture is substantially vertical. The well from which the fracture is formed may by substantially vertical or substantially horizontal.

When circulating cold fluids through a formation fracture, the formation is preferably relatively impermeable. This prevents loss of the cold fluid to the formation, and also prevents cooling liquid from mixing with the native water.

The first injection well 1310 preferably comprises an elongated tubular member that receives the cooling fluid en route to the subsurface formation 1330. The first injection well 1310 may further comprise an expansion valve in fluid communication with the tubular member through which the cooling fluid flows to cool the subsurface formation 1330. The expansion valve may be positioned at various points along the wellbore. In one instance, the expansion valve is positioned along the tubular member proximate an upper depth of the subsurface formation 1330.

Various cooling fluids may be used as described above. In one aspect, the cooling fluid is a slurry that comprises particles of frozen material. The particles within the cooling fluid may be formed through a process of mechanical grinding. The particles may have a composition that is different than the cooling fluid. The cooling fluid may be a mixture with a composition that is close to the eutectic composition.

In one aspect, the composition of the particles has a freezing temperature that is higher than the cooling fluid. In this instance, the particles are formed by rapidly cooling the cooling fluid below the freezing temperature of the particles, but not below the freezing temperature of the cooling fluid. In another aspect, the particles are seeded into the cooling fluid in a frozen state. The particles may comprise a biphasic material having an external portion and an internal portion such that the external portion has a higher freezing temperature than the internal portion.

In addition to the above methods, a "freeze wall" may be constructed using a plurality of freeze wells. In one aspect, this is accomplished by flowing a cooling fluid through one or more hydraulic fractures emanating from one or more freeze wells completed in a relatively impermeable formation. The hydraulic fractures may be propped or unpropped. The wells may be vertical, deviated, or horizontal. The hydraulic fractures may extend and connect between wells designated as injection wells and production wells. Alternatively, the hydraulic fractures may emanate from a dual-completed well wherein injection occurs at one point in the wellbore and production from another point in the same wellbore. In an example of a dual-completed vertical well, the cold fluid may enter the formation near the top of the fracture and be produced near the bottom of the fracture. This approach has a benefit of minimizing the number of wells required and more uniformly distributing the cold to the formation periphery via linear diffusion rather than radial diffusion.

Preferably, the cold fluid, at least initially, has antifreeze properties so that any water initially within the fracture does not freeze and block flow. Examples of such fluids include a brine, alcohol, and glycol. In this way, native water freezes within the periphery of the formation and blocks flow. After the immediately surrounding water has frozen, an alternate cold fluid may be used which does not have antifreeze properties. Unless the frozen crystals are very small (e.g., less than 50 microns, 20 microns, 10 microns, or 5 microns), it is unlikely that it will be practical to pass a slurry through a propped fracture without experiencing plugging. Generation of slurries with very small crystals is possible via several methods. One method is mechanical grinding of the slurry. Another method is to promote many small crystals rather than few large crystals for the same frozen fraction by seeding the slurry with microparticles prior to the partial freezing step or to cool the fluid extremely rapidly during the partial freezing step. In any event, it may be beneficial to inject a slurry into the well such that the solids completely melt prior to reaching the downhole fracture, thus maintaining the liquid temperature nearly constant during its transit from the surface.

Yet another method for lowering the temperature of a subsurface formation is disclosed herein. This method includes the step of completing a well having fluid communication with the subsurface formation at both a first depth and a second lower depth. A fracturing fluid is then injected into the well so as to form a fracture at a depth of the subsurface formation. In this way, fluid communication is provided between the first and second depths in the well. Then, a cooling fluid is circulated under pressure through the well and into the fractures. The cooling fluid flows from one depth to the other, thereby lowering the temperature of the subsurface formation.

The well may be completed substantially vertically within the subsurface formation. Similarly, the fracture may be substantially vertical. Alternatively, the well may be completed substantially horizontally within the subsurface formation. Similarly, the fracture may be substantially horizontal. The fracture fluid may contain proppant.

Figure 14:
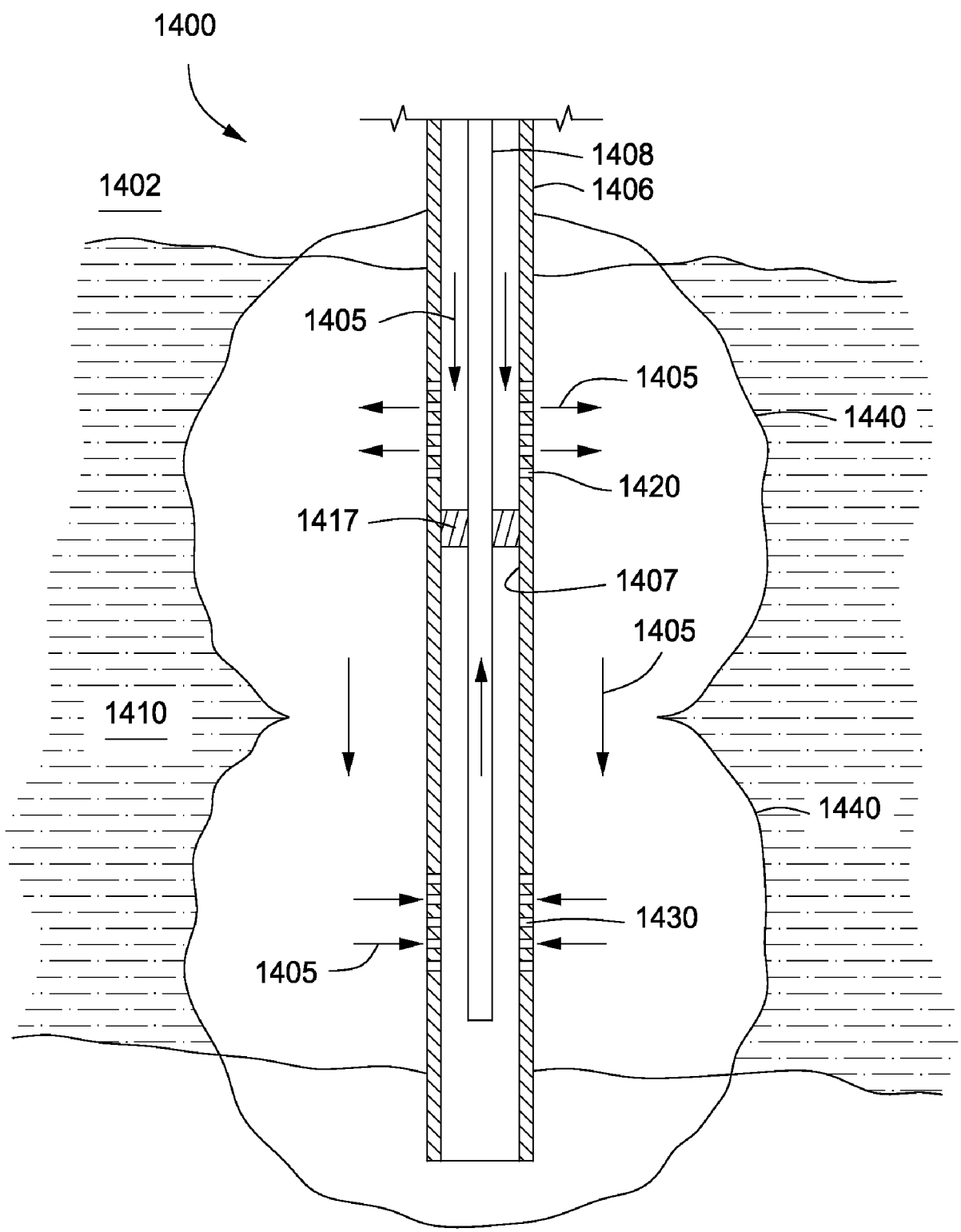
FIG. 14 is a cross-sectional view of a dually completed wellbore. The wellbore forms a freeze well in an alternate embodiment.

FIG. 14 is a cross-sectional view of a dually completed wellbore 1440 as may be used to practice the above described method. The illustrative wellbore 1400 is completed in a subsurface formation 1410 vertically. The wellbore 1400 is used to form a freeze well in the formation 1410.

It can be seen that the wellbore 1400 is completed at two different depths within the formation 1410. The wellbore 1400 is perforated at a first upper depth 1420, and at a second lower depth 1430. The wellbore 1400 is further fractured through the upper depth 1420, the lower depth 1430, or both. In this way fluid communication is established across the formation 1410 and between the upper 1420 and lower 1430 depths.

In one aspect, the wellbore 1400 is completed with a string of casing 1406. A layer of cement (not shown) may optionally be provided to support the casing 1406. An elongated tubular member 1408 is then run into the wellbore 1406. The tubular member 1408 is hung from the surface using any known completion methods and equipment.

It is noted that an annular region 1407 is formed between the tubular member 1408 and the surrounding casing 1406 (or formation 1410). A packer 1417 is set in the annular region 1407 to separate the upper 1420 and lower 1430 depths of the wellbore 1400. The packer 1400 is rated to withstand a designated amount of injection pressure.

In operation, a cooling fluid is injected into the annular region 1407 in the wellbore 1400. Arrows 1405 denote the direction of fluid travel. The fluid travels down the annular region 1407 and out the perforations in the upper depth 1420. Fluid movement to the bottom of the wellbore 1400 is restricted by the packer 1417. The cooling fluid is able to travel through the formation via formed fractures. Arrows 1405 again denote the direction of fluid travel. The fluid migrates back into the lower depth 1430 of the wellbore 1400. From there, the fluid moves up the elongated tubular member 1408 and back up to the surface 1402.

As the cooling fluid travels through the formation 1440, the temperature in the formation 1440 is lowered. In one aspect, the temperature is reduced to a point at or below the freezing point of water. Because the cooling fluid is actually traveling along a vertical plane formed by the fractures, a vertical wall or barrier is created outward from the wellbore 1400.

In this and any of the other described embodiments, the freezing rate of the subsurface formation may be slowed if the freezing point of the ambient water is increased. In this respect, if the native water has dissolved salts (and assuming the formation has permeability), it may be beneficial to first flush the region with fresh water. This may be accomplished by injecting low-salinity water through one or more wells later to be used as cold fluid injection well, or by using dedicated freeze barrier wells.

In addition to the above methods for lowering the temperature of a subsurface formation, a method for forming a freeze wall within a subsurface formation is also provided. In one aspect, the method includes determining a direction of least principal stress within the subsurface formation. A plurality of cooling wellbores is then formed along the direction perpendicular to said direction of least principal stress. A fracturing fluid is injected into at least some of the cooling wellbores so as to form substantially vertical fractures at a depth of the subsurface formation, thereby providing fluid communication between the cooling wellbores. Certain of those cooling wellbores are then designated as injectors, and certain of them are designated as producers. A cooling fluid is injected under pressure into the injectors and further into the fractures so as to lower the temperature of the subsurface formation. At least a portion of the cooling fluid may then be circulated back up to the surface through the producers. In this way an extended continuous freeze wall can be constructed that will minimize the number of wells required.

CONCLUSION

The above-described processes may be of merit in connection with the recovery of hydrocarbons in the Piceance Basin of Colorado. Some have estimated that in some oil shale deposits of the Western United States, up to 1 million barrels of oil may be recoverable per surface acre. One study has estimated the oil shale resource within the nahcolite-bearing portions of the oil shale formations of the Piceance Basin to be 400 billion barrels of shale oil in place. Overall, up to 1 trillion barrels of shale oil may exist in the Piceance Basin alone.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

While it will be apparent that the invention herein described is well calculated to achieve the benefits and advantages set forth above, it will be appreciated that the invention is susceptible to modification, variation and change without departing from the spirit thereof.

What is claimed is:

1. A method of lowering the temperature of a subsurface formation, the subsurface formation comprising oil shale, the method comprising:
   completing a well having fluid communication with the subsurface formation at a first depth and a second lower depth;
   injecting a fracturing fluid into the well so as to form a fracture at a depth of the subsurface formation, and thereby providing fluid communication between the first and second depths in the well; and
   circulating a cooling fluid under pressure through the well and into the fracture so as to cause the cooling fluid to flow from the well, into subsurface formation at the first depth, to the subsurface formation at the second depth, and back into the well, thereby lowering the temperature of the subsurface formation.

2. The method of claim 1, wherein:
   the well is substantially vertical within the subsurface formation; and
   the fracture is substantially vertical.

3. The method of claim 1, wherein
   the fracture is substantially vertical.

4. The method of claim 1, wherein the fracture fluid contains proppant.

5. The method of claim 1, wherein the cooling fluid is comprised at least of 50 mole percent of methane, ethane, propane, propylene, ethylene, isobutane, or a mixture thereof.

6. The method of claim 1, wherein the fracture is substantially vertical.

7. The method of claim 1, wherein the well comprises an elongated tubular member that receives the cooling fluid en route to the subsurface formation.

8. The method of claim 7, wherein the well further comprises an expansion valve in fluid communication with the tubular member through which the cooling fluid flows to cool the subsurface formation.

9. The method of claim 8, wherein the expansion valve is positioned along the tubular member proximate an upper depth of the subsurface formation.

10. The method of claim 1, wherein the cooling fluid is a slurry that comprises particles of frozen material.

11. The method of claim 10, wherein the particles are less than 50 microns in size.

12. The method of claim 10, wherein the cooling fluid defines a partially frozen salt-water mixture, a partially frozen alcohol-water mixture, or a partially frozen glycol-water mixture.

13. The method of claim 10, wherein the particles are formed through a process of mechanical grinding.

14. The method of claim 10, wherein the particles have a composition different than the cooling fluid.

15. The method of claim 10, wherein the composition of the particles has a freezing temperature that is higher than the cooling fluid, and the particles are formed by rapidly cooling the cooling fluid below the freezing temperature of the particles, but not below the freezing temperature of the cooling fluid.

16. The method of claim 10, wherein the particles are seeded into the cooling fluid in a frozen state.

17. The method of claim 10, wherein the particles comprise a biphasic material having an external portion and an internal portion such that the external portion has a higher freezing temperature than the internal portion.

18. The method of claim 1, wherein the cooling fluid is a liquid selected from the group consisting of an alcohol, an alcohol mixture, or an alcohol-water mixture.

19. The method of claim 1, wherein the cooling fluid comprises a eutectic mixture.

20. The method of claim 1, wherein the fracturing fluid comprises a proppant to prop the formation.

21. The method of claim 1, wherein the well is formed outside of an area under shale oil development.

22. The method of claim 1, wherein the subsurface formation comprises in situ water, and the cooling fluid cools the subsurface formation sufficient to freeze at least a portion of the in situ water.

23. The method of claim 22, further comprising:
   injecting low-salinity water into at least a portion of the subsurface formation to reduce a natural salinity of the in situ water and to raise the freezing temperature of the in situ water.

* * * * *